(12) United States Patent
Wakuda

(10) Patent No.: US 11,909,290 B2
(45) Date of Patent: Feb. 20, 2024

(54) ELECTROMAGNETIC DRIVE DEVICE AND OPERATION DEVICE

(71) Applicant: ALPS ALPINE CO., LTD., Tokyo (JP)

(72) Inventor: Hiroshi Wakuda, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 415 days.

(21) Appl. No.: 17/446,755

(22) Filed: Sep. 2, 2021

(65) Prior Publication Data

US 2021/0399617 A1    Dec. 23, 2021

Related U.S. Application Data

(63) Continuation of application No. PCT/JP2020/006538, filed on Feb. 19, 2020.

(30) Foreign Application Priority Data

Mar. 12, 2019    (JP) ................ 2019-044994

(51) Int. Cl.
    *H02K 33/00*      (2006.01)
    *H02K 33/12*      (2006.01)
    *B06B 1/04*      (2006.01)

(52) U.S. Cl.
    CPC ............ *H02K 33/12* (2013.01); *B06B 1/04* (2013.01)

(58) Field of Classification Search
    CPC .. H02K 7/1869; H02K 7/1876; H02K 7/1892; H02K 33/00; H02K 33/02;
(Continued)

(56) References Cited

U.S. PATENT DOCUMENTS 2,789,177 A * 4/1957 Brockway ............ H01H 50/76
                                                      335/93
3,400,316 A * 9/1968 Kuschel ................ H02K 33/02
                                                     327/461

(Continued)

FOREIGN PATENT DOCUMENTS

JP      2007-037273      2/2007
JP      2014-207846      10/2014
(Continued)

OTHER PUBLICATIONS

International Search Report for PCT/JP2020/006538 dated Apr. 21, 2020.

*Primary Examiner* — Maged M Almawri
(74) *Attorney, Agent, or Firm* — IPUSA, PLLC

(57) ABSTRACT

An electromagnetic drive device includes a permanent magnet attached to a surface of a first yoke facing a second yoke; and first and second excitation coils to generate magnetic flux when being energized. The second yoke includes a base, and a first protruding part protruding from the base toward the first yoke, between the first and second excitation coils. The permanent magnet includes a first region; and second and third regions positioned on respective sides of the first region. The first region is magnetized to be a first pole, and the second region and the third region are magnetized to be second poles. The first region is opposite to the first protruding part, a boundary between the first and second regions is opposite to the first excitation coil, and a boundary between the first and third regions is opposite to the second excitation coil.

12 Claims, 22 Drawing Sheets

(58) Field of Classification Search
CPC ........ H02K 33/16; H02K 33/18; H02K 41/03;
H02K 41/031; H02K 2201/18; H02K
381/40–422; H02K 359/824; H02K
35/00; H02K 35/02; H02K 35/04; H02K
35/06
USPC .......... 310/12.24–12.26, 81, 80, 321, 28–30,
310/36–37, 15–29, 12, 4, 36–37, 40 MM
See application file for complete search history.

(56) References Cited

U.S. PATENT DOCUMENTS

| | | | | |
|---|---|---|---|---|
| 3,501,745 A * | 3/1970 | Beckman | H01H 51/32 | 361/207 |
| 3,602,842 A * | 8/1971 | Smith | G04C 3/10 | 318/128 |
| 3,609,419 A * | 9/1971 | Greuter | G04B 17/045 | 968/126 |
| 3,643,187 A * | 2/1972 | Stallman | H01H 50/305 | 335/132 |
| 3,643,188 A * | 2/1972 | Puetz | H01H 50/045 | 335/132 |
| 3,643,190 A * | 2/1972 | Puetz | H01H 50/045 | 335/132 |
| 3,806,849 A * | 4/1974 | Hughes | H01H 50/22 | 335/201 |
| 4,154,559 A * | 5/1979 | Enomoto | F04B 45/047 | 417/413.1 |
| 4,169,972 A * | 10/1979 | Black, III | H01H 23/02 | 200/557 |
| 4,272,695 A * | 6/1981 | Buchwald | H01R 39/58 | 310/245 |
| 4,338,107 A * | 7/1982 | Swallow | F25J 3/0223 | 252/375 |
| 4,344,103 A * | 8/1982 | Nagamoto | H01H 51/2272 | 335/133 |
| 4,371,855 A * | 2/1983 | Lenzing | H01H 50/22 | 29/602.1 |
| 4,388,757 A * | 6/1983 | Takeyama | H01H 51/24 | 29/882 |
| 4,447,794 A * | 5/1984 | Harbauer | H01H 50/24 | 335/203 |
| 4,450,328 A * | 5/1984 | Nishizako | H01H 9/46 | 218/148 |
| 4,473,808 A * | 9/1984 | Flierl | H01H 50/46 | 335/245 |
| 4,489,225 A * | 12/1984 | Masuda | H01H 9/362 | 218/39 |
| 4,495,538 A * | 1/1985 | Thomas | H01H 89/08 | 200/DIG. 42 |
| 4,506,243 A * | 3/1985 | Okado | H01H 50/04 | 335/132 |
| 4,518,910 A * | 5/1985 | Hottenrott | G01R 1/07314 | 324/750.25 |
| 4,529,848 A * | 7/1985 | Cherry | H03K 17/98 | 200/600 |
| 4,532,487 A * | 7/1985 | Nagamoto | H01H 50/28 | 335/106 |
| 4,539,451 A * | 9/1985 | Mori | H01H 9/36 | 218/22 |
| 4,555,682 A * | 11/1985 | Gounji | H03H 9/562 | 333/186 |
| 4,557,875 A * | 12/1985 | Palfi | B01D 3/16 | 261/75 |
| 4,616,202 A * | 10/1986 | Kakizoe | H01H 50/546 | 335/121 |
| 4,616,203 A * | 10/1986 | Kakizoe | H01H 9/342 | 335/131 |
| 4,628,163 A * | 12/1986 | Mori | H01H 9/46 | 218/151 |
| 4,639,905 A * | 1/1987 | Goodloe | G01V 1/053 | 367/75 |
| 4,697,581 A * | 10/1987 | Endo | A61H 23/0218 | 601/78 |
| 4,766,278 A * | 8/1988 | Raab | H01H 23/164 | 200/260 |
| 4,803,316 A * | 2/1989 | Hayashi | H01H 13/20 | 200/345 |
| 4,812,670 A * | 3/1989 | Goulet | H01B 7/00 | 180/289 |
| 4,825,111 A * | 4/1989 | Hommes | B60L 15/005 | 318/135 |
| 4,926,014 A * | 5/1990 | Cummings | B60H 1/0065 | 200/61.86 |
| 4,940,958 A * | 7/1990 | Ootsuka | H01H 51/2209 | 335/236 |
| 4,969,844 A * | 11/1990 | Sako | H01H 50/14 | 439/733.1 |
| 4,978,911 A * | 12/1990 | Perry | G01R 21/133 | 700/286 |
| 4,992,765 A * | 2/1991 | Hirota | H01H 50/021 | 335/131 |
| 5,003,137 A * | 3/1991 | Tateishi | H01H 9/36 | 218/151 |
| 5,010,432 A * | 4/1991 | Fukushima | G11B 5/53 | 360/130.22 |
| 5,111,697 A * | 5/1992 | Habermann | H02K 33/00 | 73/668 |
| 5,227,757 A * | 7/1993 | Hirota | H01H 50/443 | 439/733.1 |
| 5,290,980 A * | 3/1994 | Cummings | H01H 19/58 | 200/11 R |
| 5,374,912 A * | 12/1994 | Houck, III | H01H 50/045 | 335/257 |
| 5,397,955 A * | 3/1995 | Takagi | H02N 2/08 | 310/323.03 |
| 5,495,220 A * | 2/1996 | Takaya | H01H 50/305 | 335/274 |
| 5,540,593 A * | 7/1996 | Takahashi | H01R 13/2421 | 439/591 |
| 5,543,956 A * | 8/1996 | Nakagawa | G02B 26/085 | 359/872 |
| 5,559,426 A * | 9/1996 | Shea | H01H 9/563 | 218/123 |
| 5,576,676 A * | 11/1996 | Koller | H01H 50/047 | 361/819 |
| 5,578,980 A * | 11/1996 | Okubo | H01H 9/542 | 335/132 |
| 5,594,399 A * | 1/1997 | Blanchard | H01H 89/08 | 335/132 |
| 5,644,176 A * | 7/1997 | Katagiri | H02K 41/031 | 310/68 B |
| 5,677,655 A * | 10/1997 | Hinata | H01H 50/14 | 335/132 |
| 5,680,084 A * | 10/1997 | Kishi | H01H 1/66 | 335/154 |
| 5,835,612 A * | 11/1998 | Fujihira | H04R 9/06 | 381/412 |
| 5,844,186 A * | 12/1998 | Meriwether | H01H 9/282 | 200/43.11 |
| 5,886,325 A * | 3/1999 | Lund | H05B 6/06 | 219/661 |
| 5,892,422 A * | 4/1999 | Montaigu | H01H 51/065 | 335/131 |
| 6,033,233 A * | 3/2000 | Haseyama | H01R 13/2421 | 439/515 |
| 6,043,572 A * | 3/2000 | Nagai | G03F 7/70691 | 310/12.25 |
| 6,057,554 A * | 5/2000 | Plesko | H03K 17/955 | 250/221 |
| 6,129,527 A * | 10/2000 | Donahoe | F04B 35/045 | 417/418 |
| 6,163,091 A * | 12/2000 | Wasson | H02K 41/03 | 310/12.22 |
| 6,169,469 B1* | 1/2001 | Misumi | H01H 51/29 | 335/203 |
| 6,218,767 B1* | 4/2001 | Akada | H02N 2/0085 | 310/323.02 |

(56) References Cited

U.S. PATENT DOCUMENTS

| | | | |
|---|---|---|---|
| 6,413,117 B1* | 7/2002 | Annerino | H01R 12/7076 439/500 |
| 6,462,439 B1* | 10/2002 | Denne | H02K 41/02 60/520 |
| 6,731,187 B2* | 5/2004 | Kurihara | H03H 9/0514 333/192 |
| 6,750,570 B1* | 6/2004 | Grehant | H02K 41/031 310/12.26 |
| 6,993,147 B2* | 1/2006 | Guenther | H04R 11/02 381/409 |
| 7,193,346 B2* | 3/2007 | Kim | H02K 7/061 310/81 |
| 7,291,956 B2* | 11/2007 | Itoh | H02K 3/26 310/71 |
| 7,355,305 B2* | 4/2008 | Nakamura | H02K 33/06 310/36 |
| 7,382,510 B2* | 6/2008 | Yoda | H02N 1/006 310/309 |
| 7,518,287 B2* | 4/2009 | Hirasawa | H10N 30/2045 310/323.02 |
| 7,671,493 B2* | 3/2010 | Takashima | G06F 3/016 310/15 |
| 7,911,098 B2* | 3/2011 | Lee | H02K 33/16 310/20 |
| 7,999,421 B2* | 8/2011 | Kim | H02K 33/18 310/15 |
| 8,188,623 B2* | 5/2012 | Park | H02K 33/16 310/12.01 |
| 8,222,782 B2* | 7/2012 | Saito | H02K 7/063 310/68 B |
| 8,237,314 B2* | 8/2012 | Lee | H02K 33/18 310/15 |
| 8,269,379 B2* | 9/2012 | Dong | H02K 33/16 310/28 |
| 8,278,786 B2* | 10/2012 | Woo | H02K 33/16 310/15 |
| 8,288,898 B2* | 10/2012 | Jun | H02K 33/16 310/34 |
| 8,400,027 B2* | 3/2013 | Dong | H02K 33/16 310/25 |
| 8,461,969 B2* | 6/2013 | An | H02K 33/06 318/132 |
| 8,587,162 B2* | 11/2013 | Kagami | A61C 17/32 310/38 |
| 8,624,449 B2* | 1/2014 | Kim | H02K 33/16 310/28 |
| 8,624,450 B2* | 1/2014 | Dong | H02K 33/16 310/20 |
| 8,643,229 B2* | 2/2014 | Park | H02K 33/16 310/15 |
| 8,648,502 B2* | 2/2014 | Park | H02K 33/16 310/15 |
| 8,766,494 B2* | 7/2014 | Park | H02K 35/02 310/25 |
| 8,829,741 B2* | 9/2014 | Park | B06B 1/045 310/25 |
| 8,878,401 B2* | 11/2014 | Lee | H02K 33/16 310/15 |
| D726,795 S* | 4/2015 | Huang | D15/147 |
| 9,048,718 B2* | 6/2015 | Zhang | H02K 33/18 |
| 9,225,265 B2* | 12/2015 | Oh | G06F 3/016 |
| 9,252,648 B2* | 2/2016 | Furukawa | H02K 7/1876 |
| 9,312,744 B2* | 4/2016 | Akanuma | B06B 1/045 |
| 9,467,033 B2* | 10/2016 | Jun | H02K 33/16 |
| 9,543,816 B2* | 1/2017 | Nakamura | H02K 33/16 |
| 9,553,497 B2* | 1/2017 | Kim | B06B 1/045 |
| 9,614,425 B2* | 4/2017 | Jin | H02K 33/12 |
| 9,748,827 B2* | 8/2017 | Dong | H02K 33/16 |
| 9,762,110 B2* | 9/2017 | Wang | H02K 33/16 |
| 9,831,415 B2* | 11/2017 | Park | B06B 1/14 |
| 9,871,432 B2* | 1/2018 | Mao | H02K 33/16 |
| 9,906,109 B2* | 2/2018 | Endo | H02K 33/16 |
| 9,966,827 B2* | 5/2018 | Wang | H02K 33/16 |
| 9,985,508 B2* | 5/2018 | Mao | H02K 33/16 |
| 10,008,894 B2* | 6/2018 | Mao | H02K 1/34 |
| 10,033,257 B2* | 7/2018 | Zhang | H02K 33/12 |
| 10,423,230 B2 | 9/2019 | Kim et al. | |
| 2002/0109424 A1* | 8/2002 | Iwabuchi | H04R 9/06 310/81 |
| 2002/0131612 A1* | 9/2002 | Son | B06B 1/045 381/412 |
| 2003/0094861 A1* | 5/2003 | Shimizu | H02K 33/10 310/36 |
| 2004/0059245 A1* | 3/2004 | Watanabe | G06F 3/0338 600/552 |
| 2004/0150277 A1* | 8/2004 | Moriyasu | H02K 33/18 310/15 |
| 2004/0169425 A1* | 9/2004 | Aihara | B06B 1/045 310/15 |
| 2006/0002577 A1* | 1/2006 | Won | B06B 1/045 381/396 |
| 2006/0028070 A1* | 2/2006 | Sahin Nomaler | H02K 41/031 310/12.25 |
| 2006/0066164 A1* | 3/2006 | Kim | H02K 7/063 310/81 |
| 2008/0258567 A1* | 10/2008 | Mukaide | H02K 41/03 310/12.25 |
| 2008/0259467 A1* | 10/2008 | Chung | G02B 7/08 359/814 |
| 2009/0036807 A1* | 2/2009 | Habatjou | A61H 23/0263 601/134 |
| 2009/0086188 A1* | 4/2009 | Onojima | G01S 7/481 356/4.01 |
| 2009/0096299 A1* | 4/2009 | Ota | B06B 1/045 310/25 |
| 2009/0146508 A1* | 6/2009 | Peng | H02K 7/1876 310/15 |
| 2009/0243410 A1* | 10/2009 | Kleibl | B06B 1/166 405/232 |
| 2009/0267423 A1* | 10/2009 | Kajiwara | H02K 33/02 310/38 |
| 2010/0156199 A1* | 6/2010 | Peng | H02K 35/02 310/12.25 |
| 2010/0213773 A1* | 8/2010 | Dong | H02K 33/16 310/25 |
| 2010/0289357 A1* | 11/2010 | An | H02K 5/1677 310/81 |
| 2010/0302752 A1* | 12/2010 | An | H02K 33/06 361/807 |
| 2010/0315184 A1* | 12/2010 | Morimoto | G11B 7/0935 156/60 |
| 2010/0327673 A1* | 12/2010 | Jun | H02K 33/16 310/25 |
| 2011/0006618 A1* | 1/2011 | Lee | B06B 1/045 310/25 |
| 2011/0018364 A1* | 1/2011 | Kim | H02K 33/18 310/20 |
| 2011/0018365 A1* | 1/2011 | Kim | B06B 1/045 310/20 |
| 2011/0018367 A1* | 1/2011 | Kim | B06B 1/045 310/25 |
| 2011/0062803 A1* | 3/2011 | Lee | H02K 33/18 310/29 |
| 2011/0062804 A1* | 3/2011 | Lee | H02K 33/18 310/30 |
| 2011/0063057 A1* | 3/2011 | Takahashi | H02K 35/02 335/207 |
| 2011/0068640 A1* | 3/2011 | Choi | H02K 5/04 310/25 |
| 2011/0074228 A1* | 3/2011 | Kim | H02K 33/16 310/29 |
| 2011/0074229 A1* | 3/2011 | Kim | H02K 15/14 310/29 |
| 2011/0089772 A1* | 4/2011 | Dong | H02K 33/16 310/25 |
| 2011/0101797 A1* | 5/2011 | Lee | H02K 33/16 310/29 |

(56) References Cited

U.S. PATENT DOCUMENTS

| | | | | |
|---|---|---|---|---|
| 2011/0101798 A1* | 5/2011 | Lee | H02K 33/16 | 310/29 |
| 2011/0115310 A1* | 5/2011 | Dong | H02K 33/16 | 310/28 |
| 2011/0115311 A1* | 5/2011 | Dong | H02K 33/16 | 310/28 |
| 2011/0133577 A1* | 6/2011 | Lee | H02K 33/18 | 310/15 |
| 2011/0133578 A1* | 6/2011 | Choi | H02K 33/18 | 310/25 |
| 2011/0156500 A1* | 6/2011 | Dong | H02K 33/16 | 310/25 |
| 2011/0169347 A1* | 7/2011 | Miyamoto | G06F 3/016 | 310/12.21 |
| 2011/0198945 A1* | 8/2011 | Nakagawa | H02K 33/16 | 310/12.25 |
| 2011/0203061 A1* | 8/2011 | Takahashi | H02K 33/18 | 310/38 |
| 2011/0227426 A1* | 9/2011 | Lee | H02K 33/18 | 310/25 |
| 2011/0241451 A1* | 10/2011 | Park | H02K 33/16 | 310/25 |
| 2011/0254782 A1* | 10/2011 | Park | H02K 33/04 | 345/173 |
| 2011/0266892 A1* | 11/2011 | Wauke | H02K 33/18 | 310/25 |
| 2011/0278960 A1* | 11/2011 | Jeon | B06B 1/045 | 310/25 |
| 2011/0316361 A1* | 12/2011 | Park | H02K 33/16 | 310/25 |
| 2012/0013202 A1* | 1/2012 | Lee | H02K 33/04 | 310/12.16 |
| 2012/0032535 A1* | 2/2012 | Park | H02K 35/02 | 310/25 |
| 2012/0049657 A1* | 3/2012 | Shikayama | H02K 41/03 | 310/12.25 |
| 2012/0049660 A1* | 3/2012 | Park | B06B 1/045 | 310/25 |
| 2012/0104875 A1* | 5/2012 | Park | H02K 33/16 | 310/25 |
| 2012/0108299 A1* | 5/2012 | Yang | H02K 33/16 | 455/567 |
| 2012/0112565 A1* | 5/2012 | Lee | H02K 33/16 | 310/20 |
| 2012/0119595 A1* | 5/2012 | Choi | H02K 1/02 | 310/25 |
| 2012/0153748 A1* | 6/2012 | Wauke | H02K 33/16 | 310/25 |
| 2012/0169148 A1* | 7/2012 | Kim | H02K 33/16 | 310/25 |
| 2012/0169151 A1* | 7/2012 | Dong | H02K 33/16 | 310/25 |
| 2012/0170792 A1* | 7/2012 | Li | H04R 9/066 | 381/412 |
| 2012/0187780 A1* | 7/2012 | Bang | H02K 33/16 | 310/25 |
| 2012/0313459 A1* | 12/2012 | Zhang | H02K 33/18 | 310/25 |
| 2012/0319506 A1* | 12/2012 | Shim | H02K 33/16 | 310/25 |
| 2013/0002054 A1* | 1/2013 | Jeon | H02K 5/04 | 310/25 |
| 2013/0043741 A1* | 2/2013 | Jun | H02K 5/225 | 310/15 |
| 2013/0049491 A1* | 2/2013 | Kim | H02K 33/16 | 310/25 |
| 2013/0082546 A1* | 4/2013 | Kim | H02K 1/34 | 310/25 |
| 2013/0099600 A1* | 4/2013 | Park | B06B 1/045 | 310/15 |
| 2013/0119785 A1* | 5/2013 | Han | G02B 27/646 | 310/12.16 |
| 2013/0119787 A1* | 5/2013 | Yu | H02K 33/16 | 310/25 |
| 2013/0134804 A1* | 5/2013 | Kim | B06B 1/045 | 310/25 |
| 2013/0140918 A1* | 6/2013 | Choi | H02K 33/18 | 310/25 |
| 2013/0169070 A1* | 7/2013 | Yoon | G06F 3/045 | 310/17 |
| 2013/0169072 A1* | 7/2013 | Oh | H02K 33/16 | 310/36 |
| 2013/0200732 A1* | 8/2013 | Jun | H02K 33/16 | 310/25 |
| 2013/0229070 A1* | 9/2013 | Akanuma | H02K 33/00 | 310/25 |
| 2013/0241321 A1* | 9/2013 | Akanuma | B06B 1/045 | 310/25 |
| 2013/0334903 A1* | 12/2013 | Kim | H02K 35/02 | 310/28 |
| 2014/0062224 A1* | 3/2014 | Kim | H02K 33/16 | 310/15 |
| 2014/0070667 A1* | 3/2014 | Oh | G06F 3/016 | 310/329 |
| 2014/0132089 A1* | 5/2014 | Jeon | H02K 33/18 | 310/14 |
| 2014/0152126 A1* | 6/2014 | Kim | B06B 1/045 | 310/25 |
| 2014/0152148 A1* | 6/2014 | Oh | B06B 3/00 | 310/321 |
| 2014/0219494 A1* | 8/2014 | Kim | H04R 9/046 | 381/400 |
| 2014/0306556 A1* | 10/2014 | Kim | H02K 33/16 | 310/25 |
| 2015/0015117 A1* | 1/2015 | Lee | B06B 1/04 | 310/20 |
| 2015/0070792 A1* | 3/2015 | Terajima | G02B 7/08 | 359/824 |
| 2015/0086066 A1* | 3/2015 | Yan | H04R 9/025 | 381/412 |
| 2015/0123498 A1* | 5/2015 | Yang | H02K 33/16 | 310/25 |
| 2015/0137627 A1* | 5/2015 | Katada | H02K 33/16 | 310/25 |
| 2015/0181344 A1* | 6/2015 | Jiang | H04R 31/006 | 381/400 |
| 2015/0194870 A1* | 7/2015 | Kim | H02K 33/18 | 310/25 |
| 2015/0328664 A1* | 11/2015 | Kim | B06B 1/0644 | 310/323.01 |
| 2015/0349619 A1* | 12/2015 | Degner | H02K 41/0356 | 310/12.21 |
| 2016/0190903 A1* | 6/2016 | Ohishi | H02K 35/04 | 310/28 |
| 2016/0192075 A1* | 6/2016 | Shibata | H04R 1/28 | 310/28 |
| 2016/0198262 A1* | 7/2016 | Wang | H04R 7/18 | 381/392 |
| 2016/0218607 A1* | 7/2016 | Oh | H02K 33/16 | |
| 2016/0254736 A1* | 9/2016 | Jin | H02K 33/16 | 310/25 |
| 2016/0336842 A1* | 11/2016 | Chun | H02K 33/16 | |
| 2016/0372998 A1* | 12/2016 | Xu | H02K 33/16 | |
| 2016/0381462 A1* | 12/2016 | Wang | H04R 7/18 | 381/400 |
| 2016/0381463 A1* | 12/2016 | Wang | H04R 9/046 | 381/400 |
| 2017/0012514 A1* | 1/2017 | Xu | H02K 33/18 | |
| 2017/0012517 A1* | 1/2017 | Huang | H02K 33/00 | |
| 2017/0012518 A1* | 1/2017 | Wang | H02K 33/16 | |
| 2017/0033651 A1* | 2/2017 | Mao | H02K 33/16 | |
| 2017/0033652 A1* | 2/2017 | Mao | H02K 33/16 | |
| 2017/0033653 A1* | 2/2017 | Wang | H02K 33/16 | |
| 2017/0033657 A1* | 2/2017 | Mao | H02K 33/16 | |
| 2017/0033673 A1* | 2/2017 | Wang | H02K 33/16 | |
| 2017/0056927 A1* | 3/2017 | Chun | B06B 1/045 | |
| 2017/0110948 A1* | 4/2017 | Akanuma | H02K 33/00 | |
| 2017/0117788 A1* | 4/2017 | Hou | H02K 1/34 | |

(56) References Cited

U.S. PATENT DOCUMENTS

| | | | | |
|---|---|---|---|---|
| 2017/0117790 A1* | 4/2017 | Mao | .......................... | H02K 5/04 |
| 2017/0117794 A1* | 4/2017 | Wang | ...................... | H02K 99/20 |
| 2017/0120297 A1* | 5/2017 | Chun | ..................... | H02K 33/16 |
| 2017/0120298 A1* | 5/2017 | Mao | ........................ | B06B 1/045 |
| 2017/0141664 A1* | 5/2017 | Kuroda | .................... | H02K 1/34 |
| 2017/0214306 A1* | 7/2017 | Katada | ................... | H02K 33/16 |
| 2017/0216884 A1* | 8/2017 | Katada | ................... | H02K 33/02 |
| 2017/0222530 A1* | 8/2017 | Liu | ......................... | H02K 33/16 |
| 2017/0246665 A1* | 8/2017 | Mori | ...................... | H02K 7/063 |
| 2017/0250596 A1* | 8/2017 | Son | ......................... | H02K 7/08 |
| 2017/0288519 A1* | 10/2017 | Kim | ....................... | H02K 33/16 |
| 2017/0288523 A1* | 10/2017 | Katada | ................. | H02P 25/032 |
| 2017/0346376 A1* | 11/2017 | Kim | ....................... | H02K 15/02 |
| 2018/0021812 A1* | 1/2018 | Akanuma | ............. | H02K 33/00 |
| | | | | 310/25 |
| 2018/0026514 A1* | 1/2018 | Mao | ....................... | H02K 5/225 |
| | | | | 310/12.16 |
| 2018/0062492 A1* | 3/2018 | Akanuma | ............. | H02K 33/16 |
| 2018/0085786 A1* | 3/2018 | Songatikamas | ......... | B06B 1/045 |
| 2018/0096570 A1* | 4/2018 | Khoshkava | ........... | H01F 13/003 |
| 2018/0123437 A1* | 5/2018 | Khoshkava | ........... | H02K 1/223 |
| 2018/0213329 A1* | 7/2018 | Kang | ..................... | H04R 9/046 |
| 2018/0219449 A1* | 8/2018 | Yamamoto | ............ | H02K 11/33 |
| 2020/0412226 A1* | 12/2020 | Ma | ........................ | H02K 33/16 |

FOREIGN PATENT DOCUMENTS

| | | |
|---|---|---|
| JP | 2017-205766 | 11/2017 |
| WO | 2017/217671 | 12/2017 |

\* cited by examiner

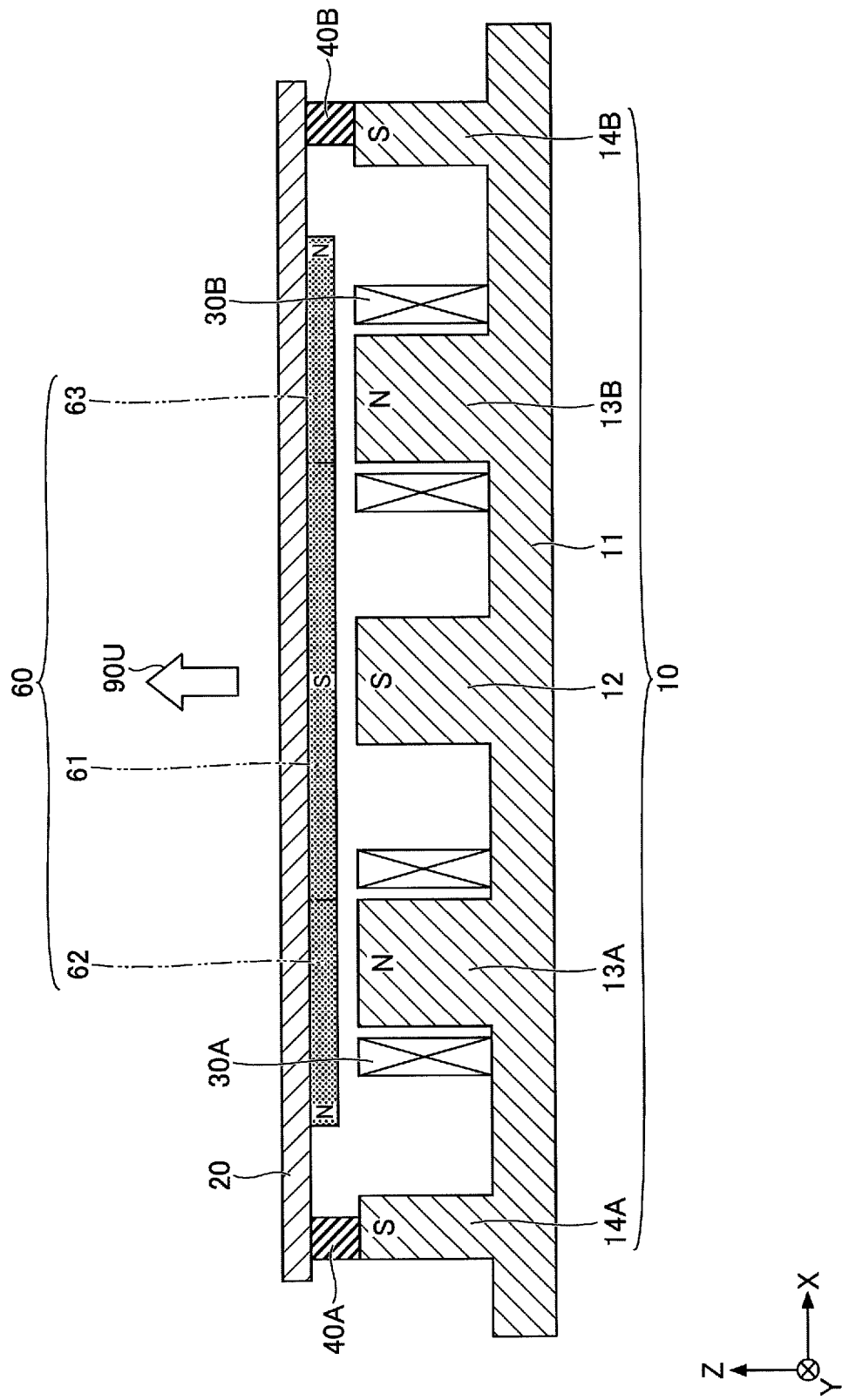

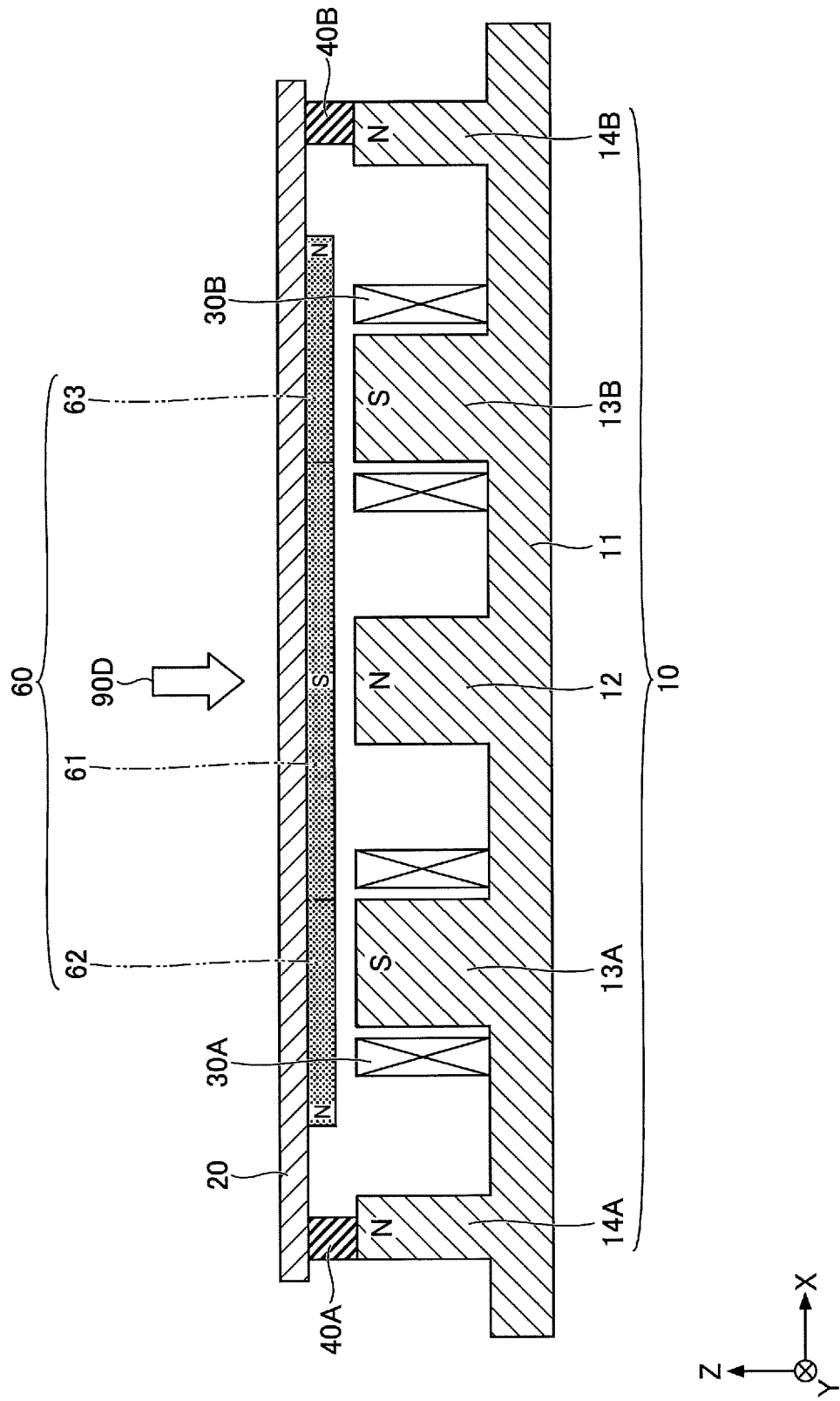

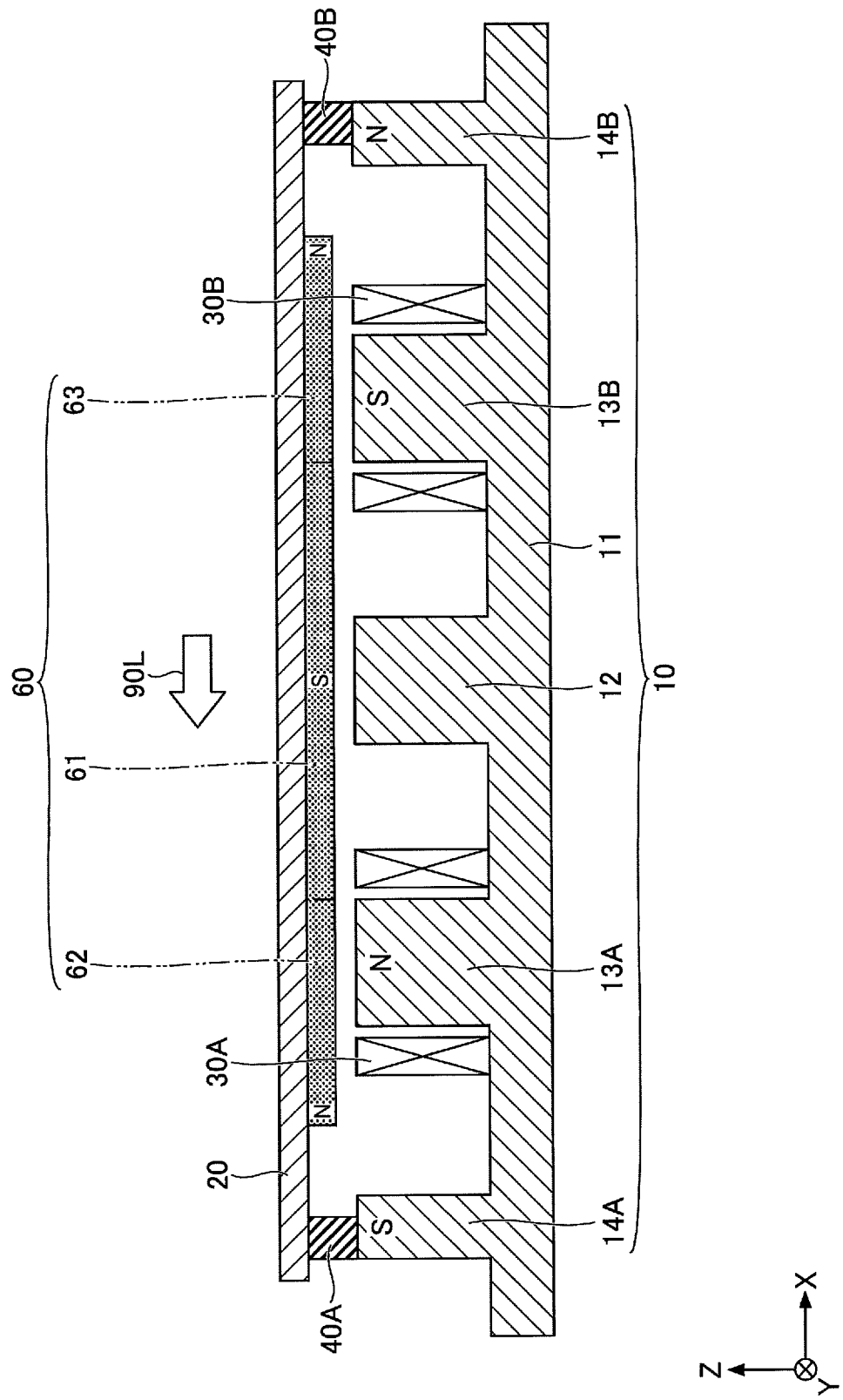

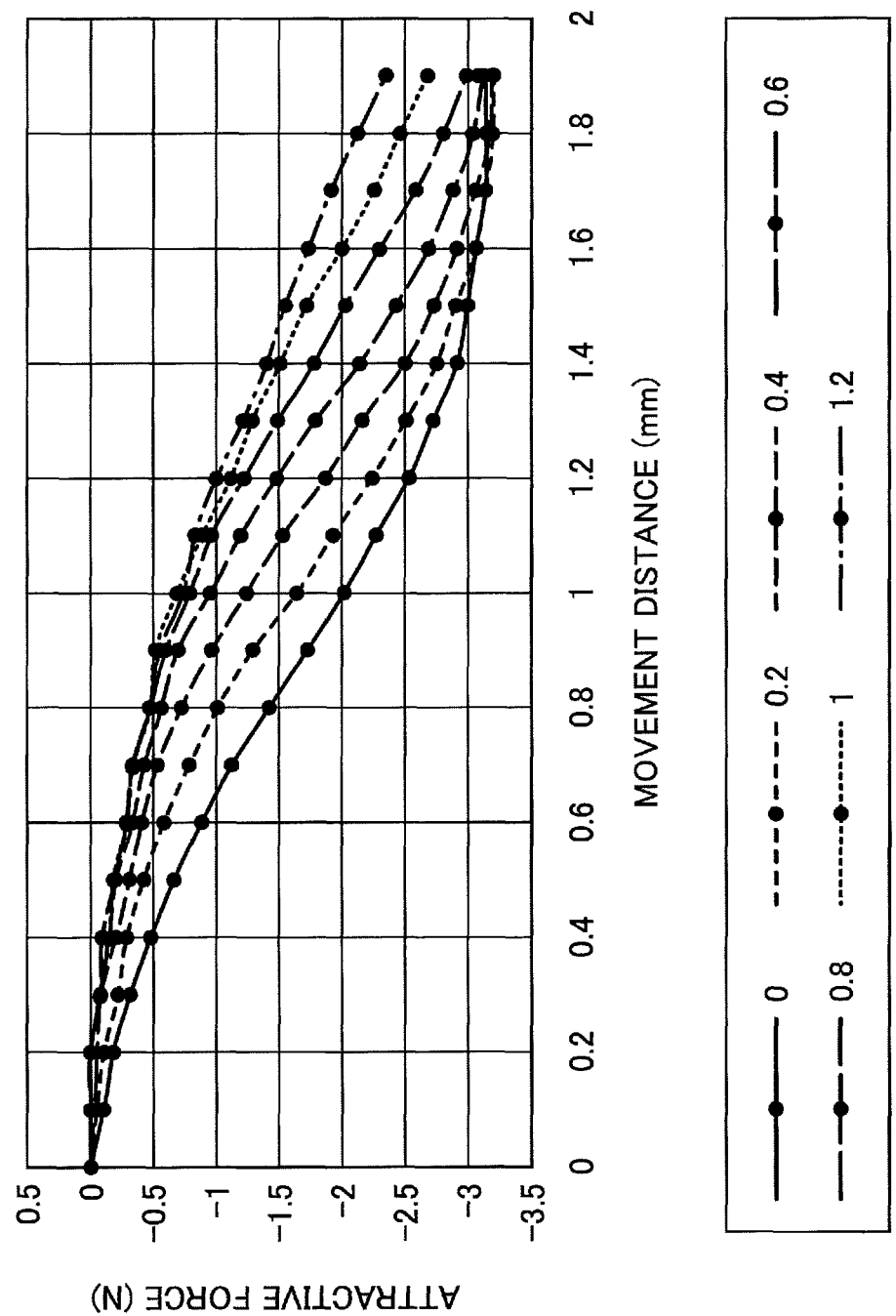

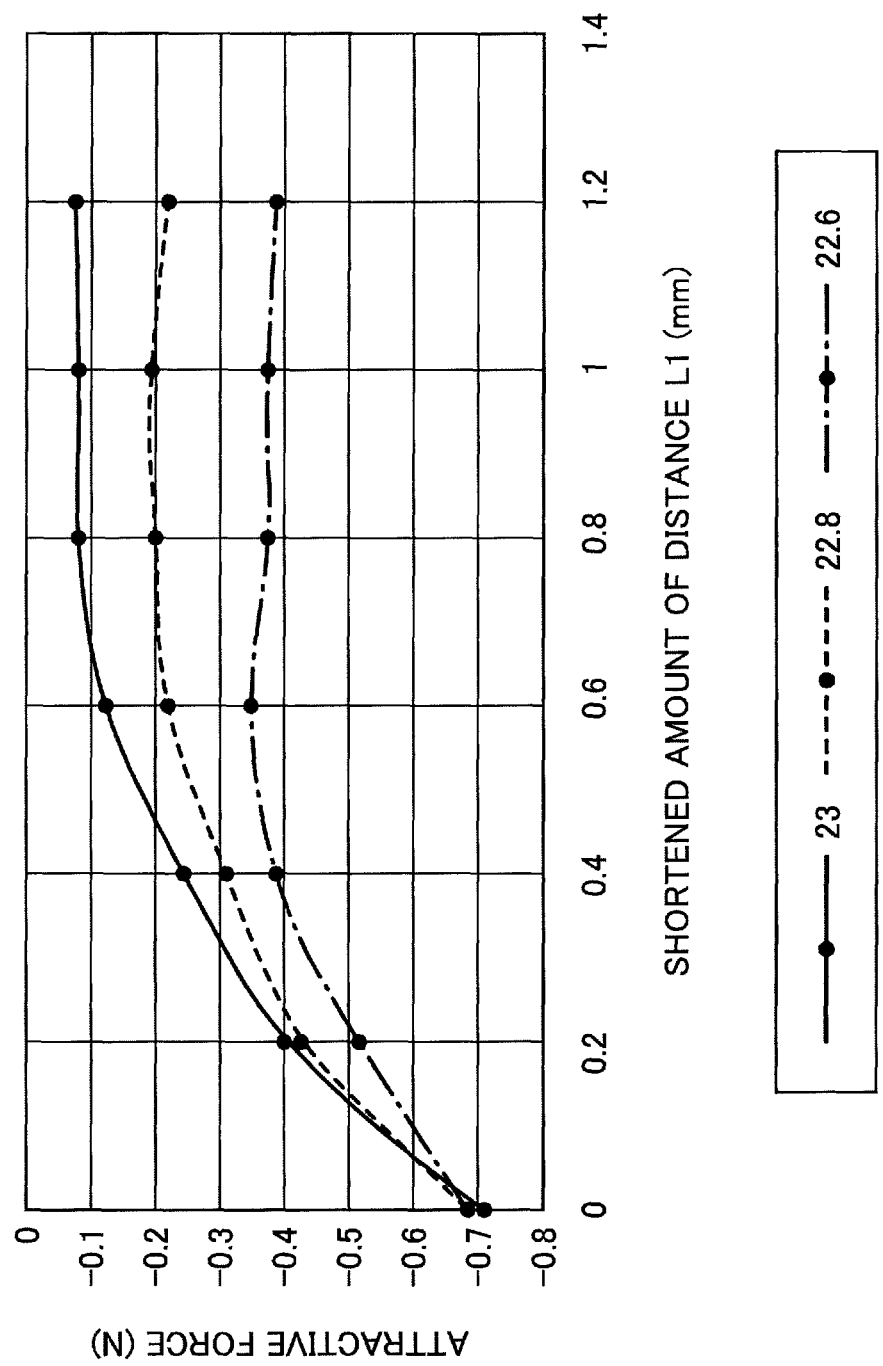

ELECTROMAGNETIC DRIVE DEVICE AND OPERATION DEVICE

CROSS-REFERENCE TO RELATED APPLICATION

The present U.S. non-provisional application is a continuation application of and claims the benefit of priority under 35 U.S.C. § 365(c) from PCT International Application PCT/JP2020/006538 filed on Feb. 19, 2020, which is designated the U.S., and is based upon and claims the benefit of priority of Japanese Patent Application No. 2019-044994 filed on Mar. 12, 2019, the entire contents of which are incorporated herein by reference.

BACKGROUND OF THE INVENTION

1. Field of the Invention

The present disclosure relates to an electromagnetic drive device and an operation device.

2. Description of the Related Art

Japanese Laid-Open Patent Application No. 2017-205766 (Patent Document 1) discloses a vibration generator that has a transducer movable in a first direction parallel to a horizontal plane, and in a second direction perpendicular to the horizontal plane.

However, in the vibration generator described in Patent Document 1, vibration in the second direction is weak due to its structure, and a large current needs to be flown to generate strong vibration in the second direction.

SUMMARY

According to an embodiment in the present disclosure, an electromagnetic drive device includes a first yoke; a second yoke arranged to be opposite to the first yoke in a first direction; a permanent magnet attached to a surface of the first yoke facing the second yoke; and a first excitation coil and a second excitation coil attached to the second yoke to generate magnetic flux when being energized. The second yoke includes a base, and a first protruding part protruding from the base toward the first yoke, between the first excitation coil and the second excitation coil, wherein the first excitation coil and the second excitation coil are arranged to have the first protruding part interposed in-between in a second direction perpendicular to the first direction, wherein an axial core direction of the first excitation coil and the second excitation coil is parallel to the first direction. The permanent magnet includes a first region, a second region positioned on one side of the first region in the second direction, and a third region positioned on another side of the first region in the second direction, wherein the first region is magnetized to be a first magnetic pole, wherein the second region and the third region are magnetized to be second magnetic poles, wherein the first region is opposite to the first protruding part, wherein a boundary between the first region and the second region is opposite to the first excitation coil, and wherein a boundary between the first region and the third region is opposite to the second excitation coil.

BRIEF DESCRIPTION OF THE DRAWINGS

FIG. 7A is a diagram illustrating a relationship between directions of currents and directions of motions in a first combination;

FIG. 7B is a diagram illustrating a relationship between directions of currents and directions of motions in a second combination;

FIG. 7C is a diagram illustrating a relationship between directions of currents and directions of motions in a third combination;

FIG. 13B is a diagram illustrating a relationship between a movement distance of a movable yoke and an attractive force in the case of setting the distance L2 to 22.8 mm;

FIG. 14 is a diagram illustrating a relationship between a shortened amount of a distance L1 and an attractive force;

DESCRIPTION OF THE PREFERRED EMBODIMENTS

In the following, embodiments in the present disclosure will be described with reference to the accompanying drawings.

According to an embodiment in the present disclosure, vibration of sufficient strength can be generated in two directions perpendicular to each other.

Note that throughout the description and the drawings, for elements having substantially the same functional configurations, duplicate descriptions may be omitted by attaching the same reference codes.

Figure 1:
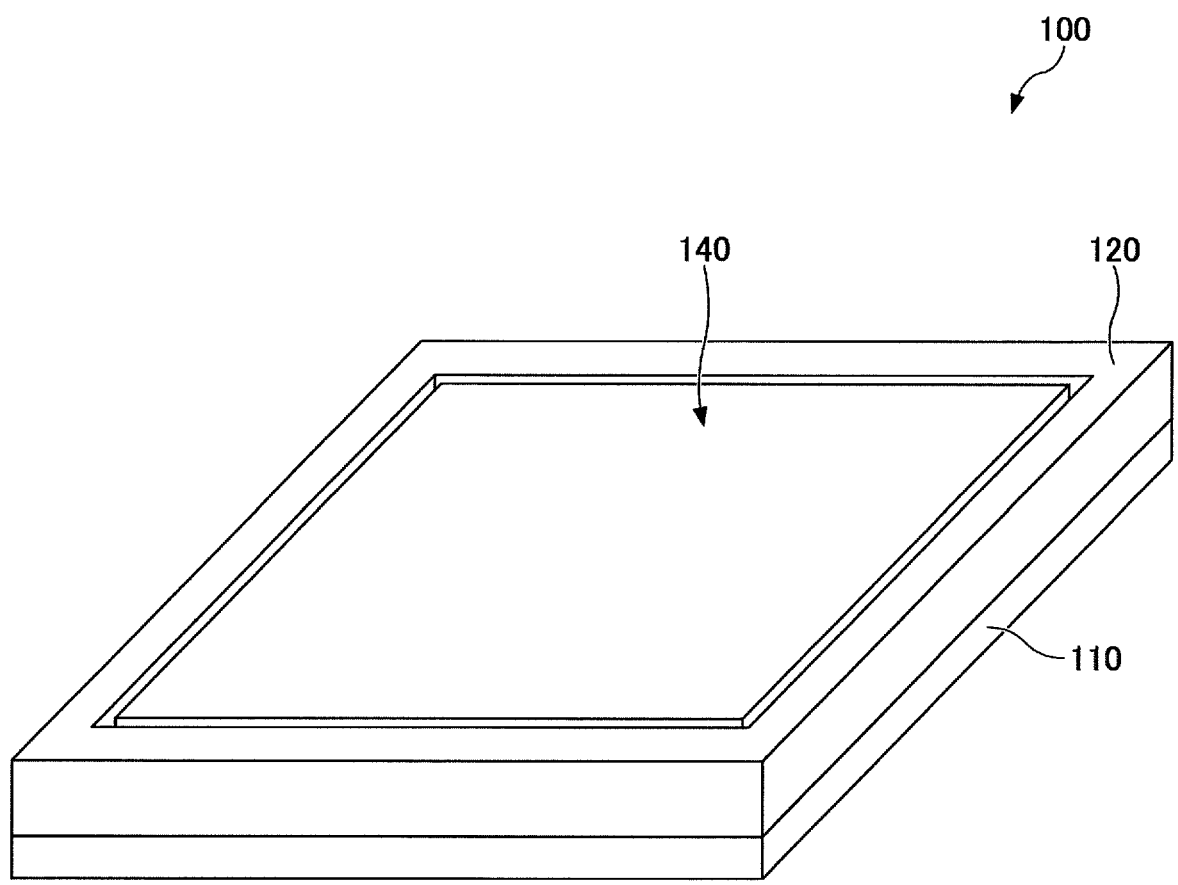
FIG. 1 is a perspective view illustrating a configuration of an operation device according to an embodiment.
Figure 2:
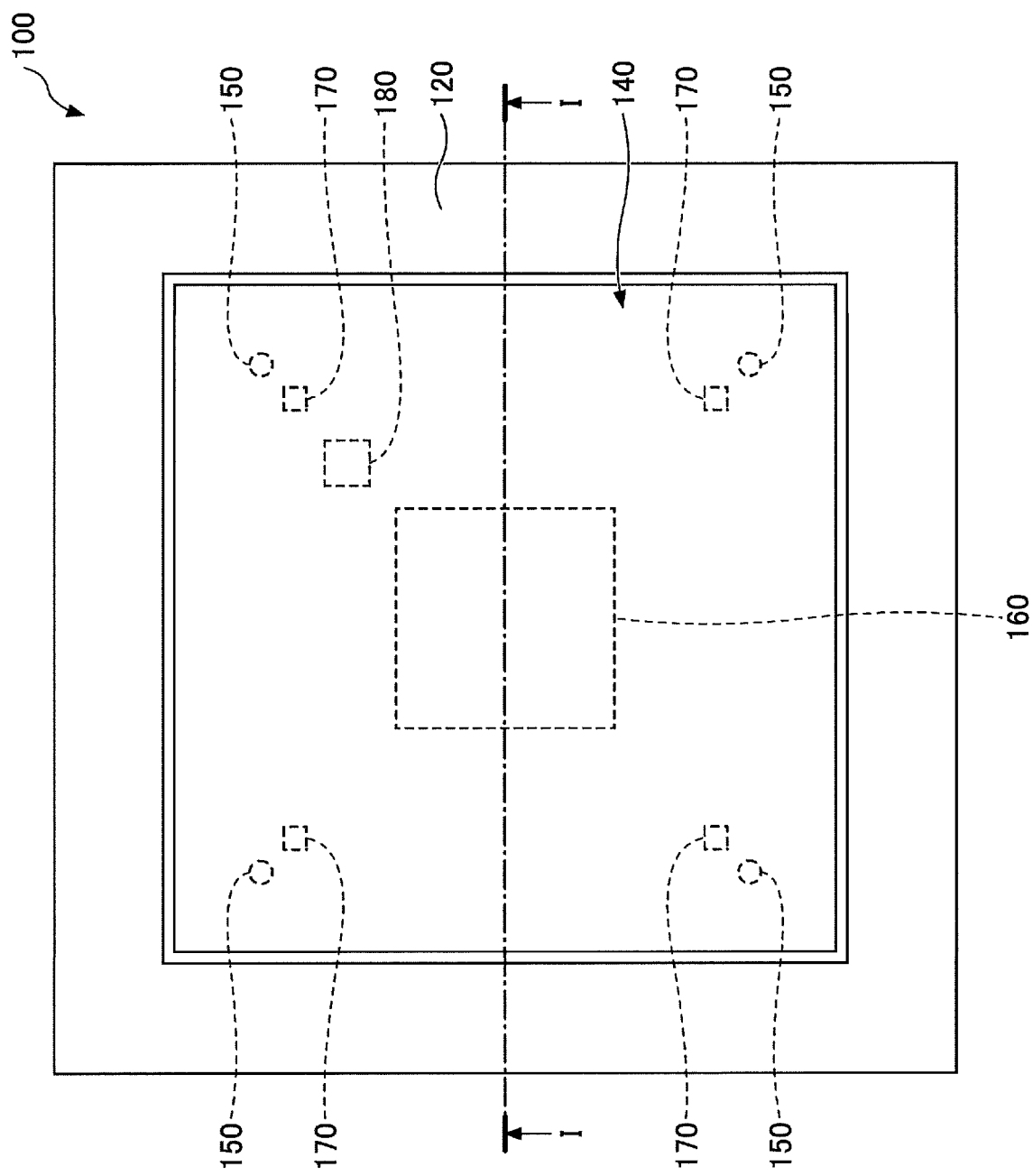
FIG. 2 is a top view illustrating a configuration of an operation device according to an embodiment.
Figure 3:
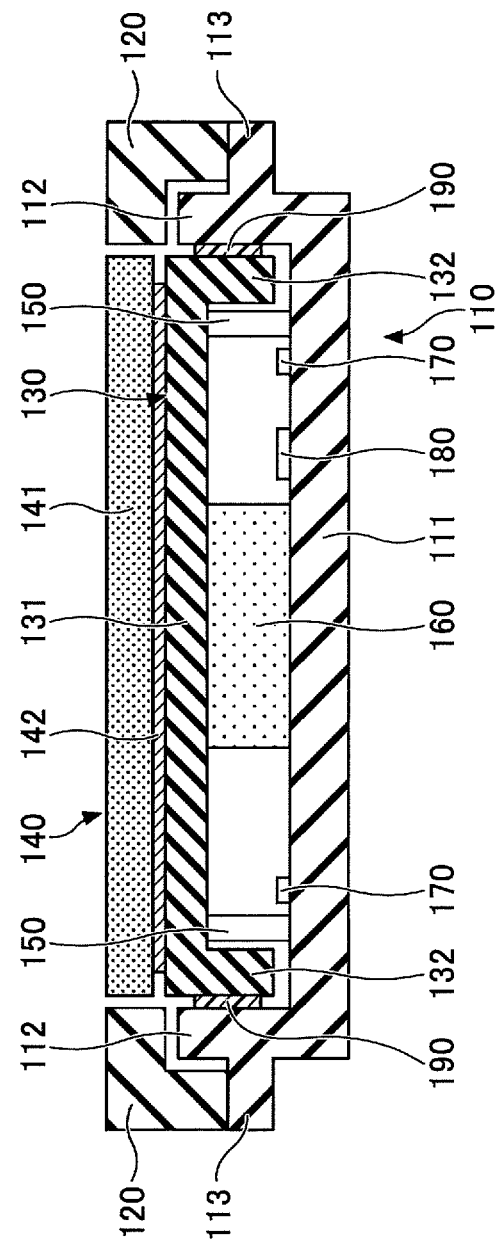
FIG. 3 is a cross sectional view illustrating a configuration of an operation device according to an embodiment.

FIG. 1 is a perspective view illustrating a configuration of an operation device according to an embodiment; FIG. 2 is a top view illustrating a configuration of the operation device according to the embodiment; and FIG. 3 is a cross sectional view illustrating a configuration of the operation device according to the embodiment. FIG. 3 corresponds to a cross sectional view along a line I-I in FIG. 2.

As illustrated in FIGS. 1 to 3, an operation device 100 according to the embodiment includes a fixed base 110, a bezel 120 fixed on the edges of the fixed base 110, and a decorative panel 141 inside the bezel 120. An electrostatic sensor 142 is arranged at a position closer to a flat plate part 111 (that will be described later) of the fixed base 110 than the decorative panel 141 is. A touch pad 140 is formed with the decorative panel 141 and the electrostatic sensor 142. A movable base 130 is arranged in a region between the flat plate part 111 and the touchpad 140. The movable base 130 has a flat plate part 131 and a wall part 132 extending from the edge of the flat plate part 131 toward the flat plate part 111. The fixed base 110 has the flat plate part 111 that is larger than the flat plate part 131 in plan view; a wall part 112 extending upward from the edge of the flat plate part 111 on the outside of the wall part 132; and a flange part 113 protruding outward from the wall part 112. The lower end of the bezel 120 contacts the flange part 113.

An actuator 160 is arranged on the flat plate part 111. The actuator 160 contacts the flat plate part 111 and the flat plate part 131. In plan view, the actuator 160 is positioned substantially at the center of the flat plate part 111 and the flat plate part 131. Between the flat plate part 111 and the flat plate part 131, around the actuator 160, multiple pretension springs 150 are arranged to bias the flat plate part 111 and the flat plate part 131 so as to attract each other in the vertical direction. The touch pad 140 is an example of an operation member. The movable base 130 and the touch pad 140 are included in a movable part. The fixed base 110 is an example of a fixed part. The actuator 160 is an example of an electromagnetic drive device. The pretension spring 150 is an example of a movable part supporting elastic member.

Between the wall part 112 and the wall part 132, a panel guide 190 that contacts the wall parts 112 and 132 is arranged. For example, the panel guide 190 has elasticity, and guides the movable base 130 inside the fixed base 110.

Multiple reflective photo interrupters 170 are arranged on the flat plate part 111 of the fixed base 110. The photo interrupters 170 emit light upward to the flat plate part 131 of the movable base 130, receive light reflected by the flat plate part 131, and thereby, are capable of detecting the distance to a portion of the flat plate part 131 irradiated with the light. For example, the photo interrupters 170 are positioned inside the four corners of the touchpad 140 in plan view. The photo interrupters 170 are examples of a detector.

A control device 180 is arranged on the fixed base 110. The control device 180 drives the actuator 160 to generate haptic feedback to a user according to operations performed on the touchpad 140, by processing as will be described later. The control device 180 is, for example, a semiconductor chip. In the present embodiment, the control device 180 is arranged on the flat plate part 111. The location where the control device 180 is arranged is not limited, and for example, may be arranged between the touchpad 140 and the movable base 130.

Figure 4:
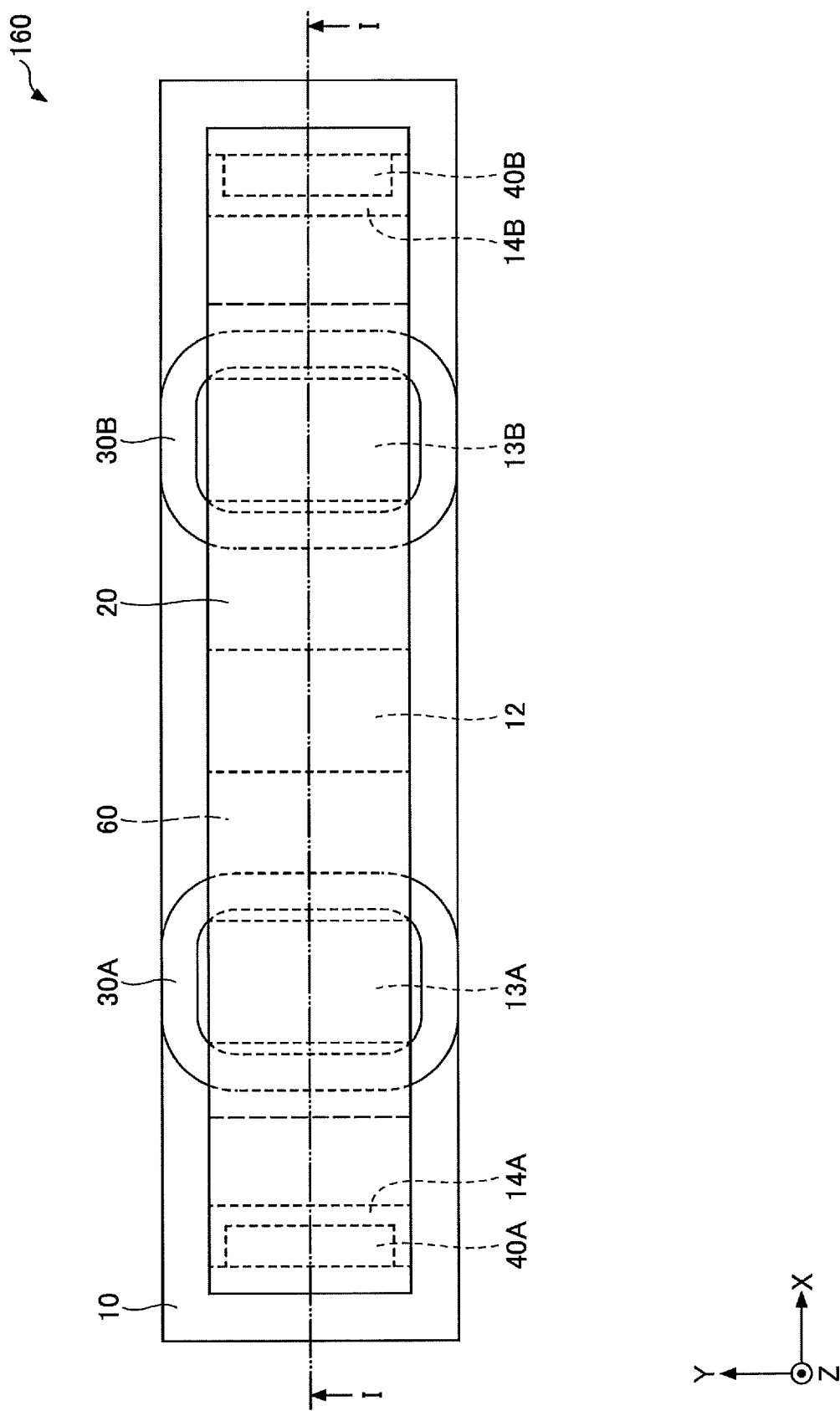
FIG. 4 is a plan view illustrating a configuration of an actuator.
Figure 5:
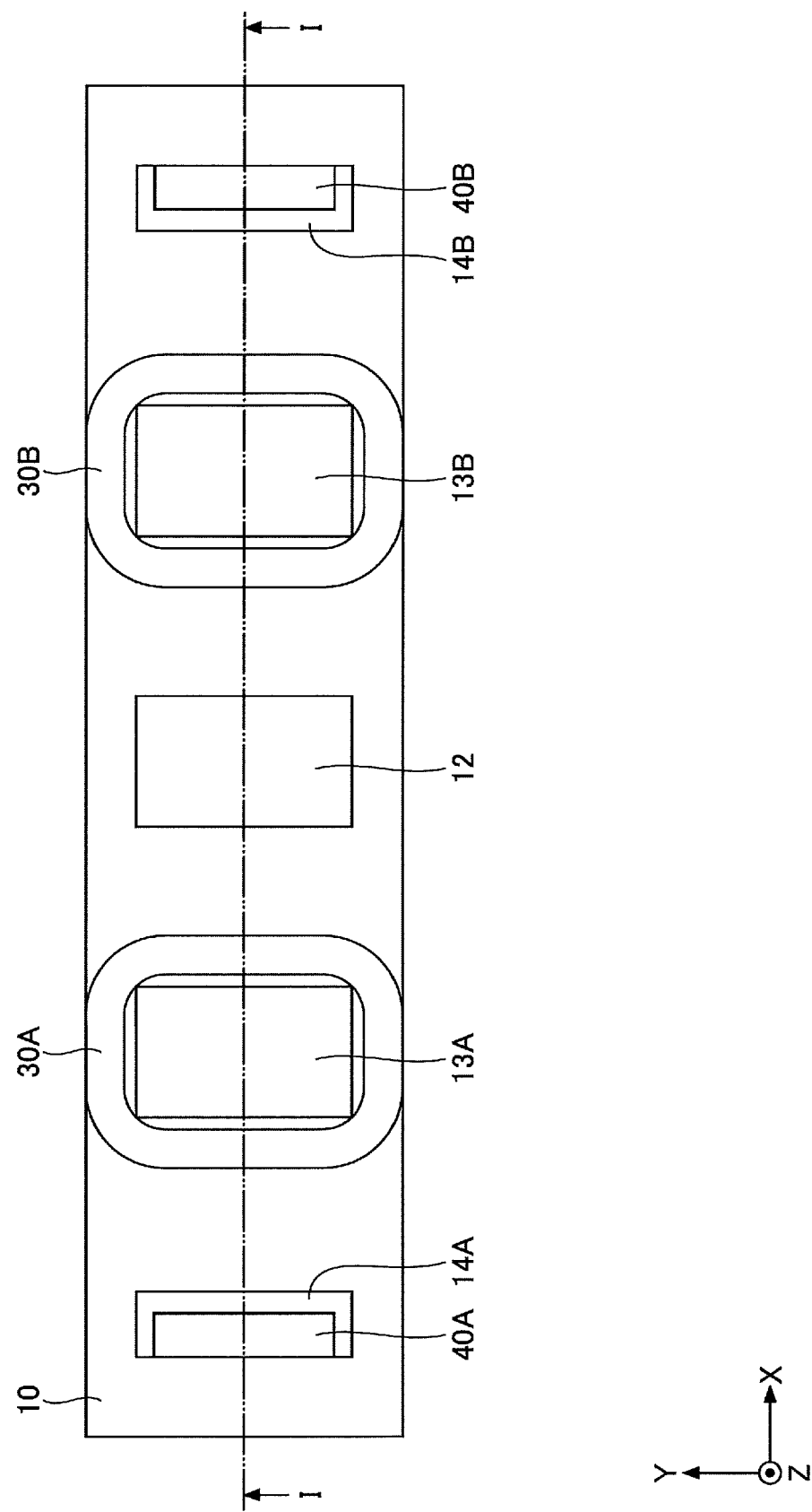
FIG. 5 is a plan view in which a movable yoke and a permanent magnet in FIG. 4 are excluded.
Figure 6:
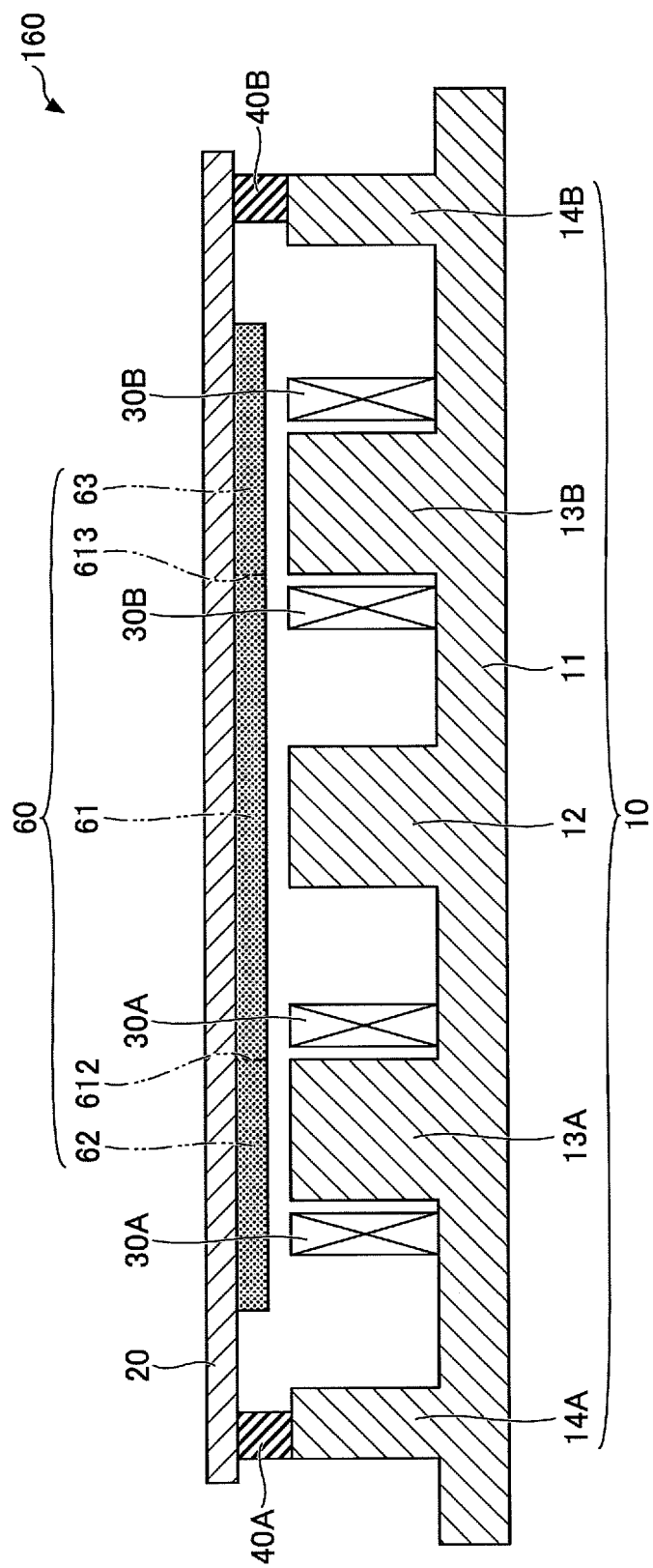
FIG. 6 is a cross sectional view illustrating a configuration of an actuator.

Next, a configuration of the actuator 160 will be described. FIG. 4 is a plan view illustrating the configuration of the actuator 160. FIG. 5 is a plan view in which a movable yoke and a permanent magnet in FIG. 4 are excluded. FIG. 6 is a cross sectional view illustrating the configuration of the actuator 160. FIG. 6 corresponds to a cross sectional view along a line I-I in FIGS. 4 and 5.

As illustrated in FIGS. 4 to 6, the actuator 160 includes a fixed yoke 10, a movable yoke 20, a first excitation coil 30A, a second excitation coil 30B, a first rubber 40A, a second rubber 40B, and a permanent magnet 60. The fixed yoke 10 has a plate-shaped base 11 having a generally rectangular planar shape. The longitudinal direction of the base 11 is defined as the X direction, the lateral direction is defined as the Y direction, and the thickness direction is defined as the Z direction. The respective axial core directions of the first excitation coil 30A and the second excitation coil 30B are parallel to the Z direction. The movable yoke 20 is an example of a first yoke. The fixed yoke 10 is an example of a second yoke. The first rubber 40A and the second rubber 40B are examples of elastic support members. The X direction corresponds to a second direction, and the Z direction corresponds to a first direction.

The fixed yoke 10 further includes a central protruding part 12 protruding upward (in the +Z direction) from the center of the base 11; a first side protruding part 14A protruding upward from an edge of the base 11 in the −X direction in the longitudinal direction; and a second side protruding part 14B protruding upward from an edge of the base 11 in the +X direction in the longitudinal direction. The first side protruding part 14A and the second side protruding part 14B are arranged at positions between which the central protruding parts 12 is interposed in the X direction. The fixed yoke 10 further includes a first iron core 13A protruding upward from the base 11, between the central protruding part 12 and the first side protruding part 14A; and a second iron core 13B protruding upward from the base 11, between the central protruding part 12 and the second side protruding part 14B. The first excitation coil 30A is wound around the first iron core, and the second excitation coil 30B is wound around the second iron core 13B. The first rubber 40A is arranged on the first side protruding part 14A, and the second rubber 40B is arranged on the second side protruding part 14B. The central protruding part 12 is an example of a first protruding part. The first side protruding part 14A and the second side protruding part 14B are examples of second protruding parts.

The movable yoke 20 is plate-shaped, and has a generally rectangular planar shape. The movable yoke 20 contacts the first rubber 40A and the second rubber 40B at its edges in the longitudinal direction. The permanent magnet 60 is attached to a surface of the movable yoke 20 facing the fixed yoke 10. The permanent magnet 60 includes a first region 61, a second region 62 positioned in the −X direction of the first region 61, and a third region 63 positioned in the +X direction of the first region 61. For example, the first region 61 is magnetized to be an S pole, and the second and third regions 62 and 63 are magnetized to be N poles. Furthermore, the permanent magnet 60 is attached to the movable yoke 20 at substantially the center in plan view, so that the first region 61 is opposite to the central protruding part 12; a boundary 612 between the first region 61 and the second region 62 is opposite to the first excitation coil 30A; and a boundary 613 between the first region 61 and the third region 63 is opposite to the second excitation coil 30B. The boundary 612 is positioned in the +X direction relative to the axial core of the first excitation coil 30A, and the boundary 613 is positioned in the −X direction relative to the axial core of the second excitation coil 30B. In other words, the boundary 612 is positioned in the +X direction relative to the center of first iron core 13A, and the boundary 613 is positioned in the −X direction relative to the center of second iron core 13B. The permanent magnet 60 magnetizes the fixed yoke 10 and the movable yoke 20, and the magnetic attractive force biases the movable yoke 20 in the Z direction toward the fixed yoke 10. The magnetic attractive force biases both ends of the movable yoke 20 in the X direction to approach the first side protruding part 14A and the second side protruding part 14B, respectively.

When generating haptic feedback to the user, the control device 180 (see FIG. 3) drives the actuator 160, so that the directions of respective currents flowing in the first excitation coil 30A and the second excitation coil 30B are inverted alternately. In other words, the control device 180 alternately inverts the direction of the current flowing in each of the first excitation coil 30A and the second excitation coil 30B, to alternately invert the pole on a surface of the first iron core 13A facing the movable yoke 20 and the pole on a surface of the second iron core 13B facing the movable yoke 20 independently from each other. As a result, according to the direction of a current flowing through the first excitation coil 30A, and the direction of a current flowing through the second excitation coil 30B, the permanent magnet 60 and the movable yoke 20 reciprocate in the X direction or the Z direction. A relationship between directions of currents and directions of motions will be described later.

For example, the first rubber 40A and the second rubber 40B have a rectangular planar shape whose longitudinal direction corresponds to the Y direction. The first rubber 40A is interposed between the first side protruding part 14A and the movable yoke 20, and the second rubber 40B is interposed between the second side protruding part 14B and the movable yoke 20. In other words, the first rubber 40A and the second rubber 40B are interposed between the fixed yoke 10 and the movable yoke 20. Therefore, unless intentionally disassembled, the first rubber 40A and the second rubber 40B are held between the fixed yoke 10 and the movable yoke 20. Note that the first rubber 40A may be fixed to the top surface of the first side protruding part 14A, fixed to the bottom surface of the movable yoke 20, or fixed to the both; and the second rubber 40B may be fixed to the upper surface of the second side protruding part 14B, fixed to the bottom surface of the movable yoke 20, or fixed to the both.

The movable yoke 20 is attached to the movable part that includes the movable base 130 (see FIG. 3) and the touchpad 140 (see FIG. 3), and the fixed yoke 10 is attached to the flat plate part 111 (see FIG. 3). It is favorable that the movable yoke 20 is attached to a position that overlaps the center of gravity of the movable part in a plane perpendicular to the Z direction, to generate vibration more evenly.

A relationship between directions of currents and directions of motions will be described. In total, there are four types of combinations in terms of the direction of a current flowing through the first excitation coil 30A, and the direction of a current flowing through the second excitation coil 30B.

In the first combination, when viewed in the +Z direction, currents flow through the first excitation coil 30A and the second excitation coil 30B counter-clockwise. FIG. 7A is a diagram illustrating a relationship between the directions of the currents and the directions of motions in the first combination. In the first combination, as illustrated in FIG. 7A, the magnetic pole of the first iron core 13A facing the movable yoke 20 becomes an N pole, the magnetic pole of the second iron core 13B facing the movable yoke 20 also becomes an N pole. On the other hand, the poles of the central protruding part 12, the first side protruding part 14A, and the second side protruding part 14B on the surfaces facing the movable yoke 20 become S poles. As a result, a repulsive force acts between the central protruding part 12 and the first region 61, a repulsive force acts between the first iron core 13A and the second region 62, and a repulsive force acts between the second iron core 13B and the third region 63. Therefore, a force 90U in the +Z direction acts on the movable yoke 20.

In the second combination, when viewed in the +Z direction, currents flow through the first excitation coil 30A and the second excitation coil 30B clockwise. FIG. 7B is a diagram illustrating a relationship between the directions of the currents and the directions of motions in the second combination. In the second combination, as illustrated in FIG. 7B, the magnetic pole of the first iron core 13A facing the movable yoke 20 becomes an S pole, the magnetic pole of the second iron core 13B facing the movable yoke 20 also becomes an S pole. On the other hand, the poles of the central protruding part 12, the first side protruding part 14A, and the second side protruding part 14B on the surfaces facing the movable yoke 20 become N poles. As a result, an attractive force acts between the central protruding part 12 and the first region 61; an attractive force acts between the first iron core 13A and the second region 62; and an attractive force acts between the second iron core 13B and the third region 63. Therefore, a force 90D in the −Z direction acts on the movable yoke 20.

Therefore, by repeating the first combination and the second combination so that currents flows through the first excitation coil 30A and the second excitation coil 30B in the same direction, the movable yoke 20 reciprocates in the Z direction. In other words, by energizing the first excitation coil 30A and the second excitation coil 30B, the movable yoke 20 vibrates in the Z direction with the neutral position being the position in the initial state.

In the third combination, when viewed in the +Z direction, a current flows through the first excitation coil 30A counter-clockwise, and a current flows through the second excitation coil 30B clockwise. FIG. 7C is a diagram illustrating a relationship between the directions of the currents and the directions of motions in the third combination. In the third combination, as illustrated in FIG. 7C, the magnetic pole of the first iron core 13A facing the movable yoke 20 becomes an N pole, and the magnetic pole of the second iron core 13B facing the movable yoke 20 becomes an S pole. Also, the magnetic pole of the first side protruding part 14A facing the movable yoke 20 becomes an S pole, and the magnetic pole of the second side protruding part 14B facing the movable yoke 20 becomes an N pole. As a result, an attractive force acts between the first side protruding part 14A and the second region 62; an attractive force acts between the first iron core 13A and the first region 61; a repulsive force acts between the second iron core 13B and the first region 61; and a repulsive force acts between the second side protruding part 14B and the third region 63. Therefore, a force 90L in the −X direction acts on the movable yoke 20.

Figure 7D:
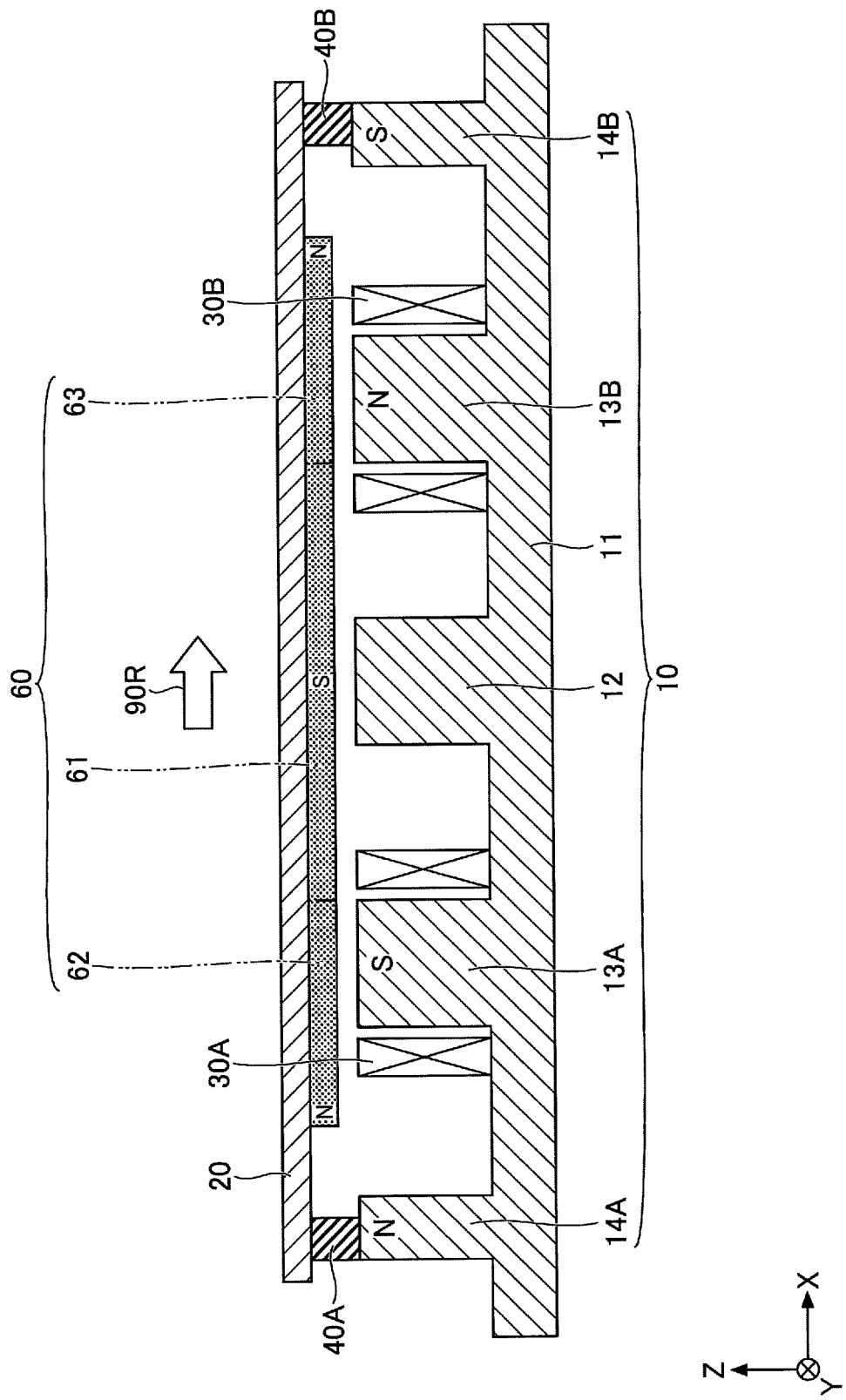
FIG. 7D is a diagram illustrating a relationship between directions of currents and directions of motions in a fourth combination.

In the fourth combination, when viewed in the +Z direction, a current flows through the first excitation coil 30A clockwise, and a current flows through the second excitation coil 30B counter-clockwise. FIG. 7D is a diagram illustrating a relationship between the directions of the currents and the directions of motions in the fourth combination. In the fourth combination, as illustrated in FIG. 7D, the magnetic pole of the first iron core 13A facing the movable yoke 20 becomes an S pole, and the magnetic pole of the second iron core 13B facing the movable yoke 20 becomes an N pole. Also, the magnetic pole of the first side protruding part 14A facing the movable yoke 20 becomes an N pole, and the magnetic pole of the second side protruding part 14B facing the movable yoke 20 becomes an S pole. As a result, a repulsive force acts between the first side protruding part 14A and the second region 62; a repulsive force acts between the first iron core 13A and the first region 61; an attractive force acts between the second iron core 13B and the first region 61; and an attractive force acts between the second side protruding part 14B and the third region 63. Therefore, a force 90R in the +X direction acts on the movable yoke 20.

Therefore, by repeating the third combination and the fourth combination so that currents flows through the first excitation coil 30A and the second excitation coil 30B in the opposite directions, the movable yoke 20 reciprocates in the X direction. In other words, by energizing the first excitation coil 30A and the second excitation coil 30B, the movable yoke 20 vibrates in the X direction with the neutral position being the position in the initial state.

Figure 8:
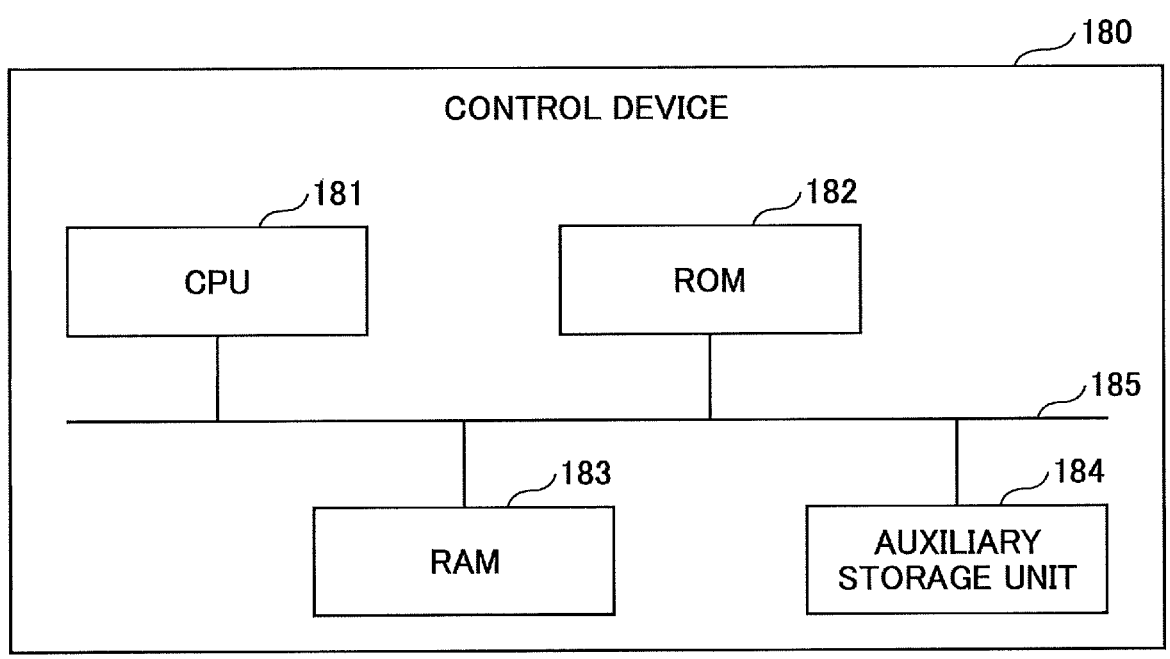
FIG. 8 is a diagram illustrating a configuration of a control device.

Next, driving of the actuator 160 by the control device 180 will be described. The control device 180 determines whether a load applied to the operating position of the touchpad 140 has reached a reference value to generate haptic feedback, and depending on the result, drives the actuator 160 to generate haptic feedback. FIG. 8 is a diagram illustrating a configuration of the control device 180.

The control device 180 includes a CPU (Central Processing Unit) 181, a ROM (Read-Only Memory) 182, a RAM (Random Access Memory) 183, and an auxiliary storage unit 184. The CPU 181, the ROM 182, the RAM 183, and the auxiliary storage unit 184 constitute what is called a computer. The units of the control device 180 are interconnected via a bus 185.

The CPU 181 executes various programs stored in the auxiliary storage unit 184 (e.g., a load determination program).

The ROM 182 is a non-volatile main memory device. The ROM 182 stores, among various programs stored in the auxiliary storage unit 184, necessary programs and data to be processed by the CPU 181. Specifically, the ROM 182 stores boot programs such as BIOS (Basic Input/Output System) and EFI (Extensible Firmware Interface).

The RAM 183 is a volatile main memory device such as a DRAM (Dynamic Random Access Memory) or an SRAM (Static Random Access Memory). The RAM 183 functions as a work area when various programs stored in the auxiliary storage unit 184 are loaded to be executed by the CPU 181.

The auxiliary storage unit 184 is an auxiliary storage device that stores various programs executed by the CPU 181 and various items of data generated by the various programs being executed by the CPU 181.

Figure 9:
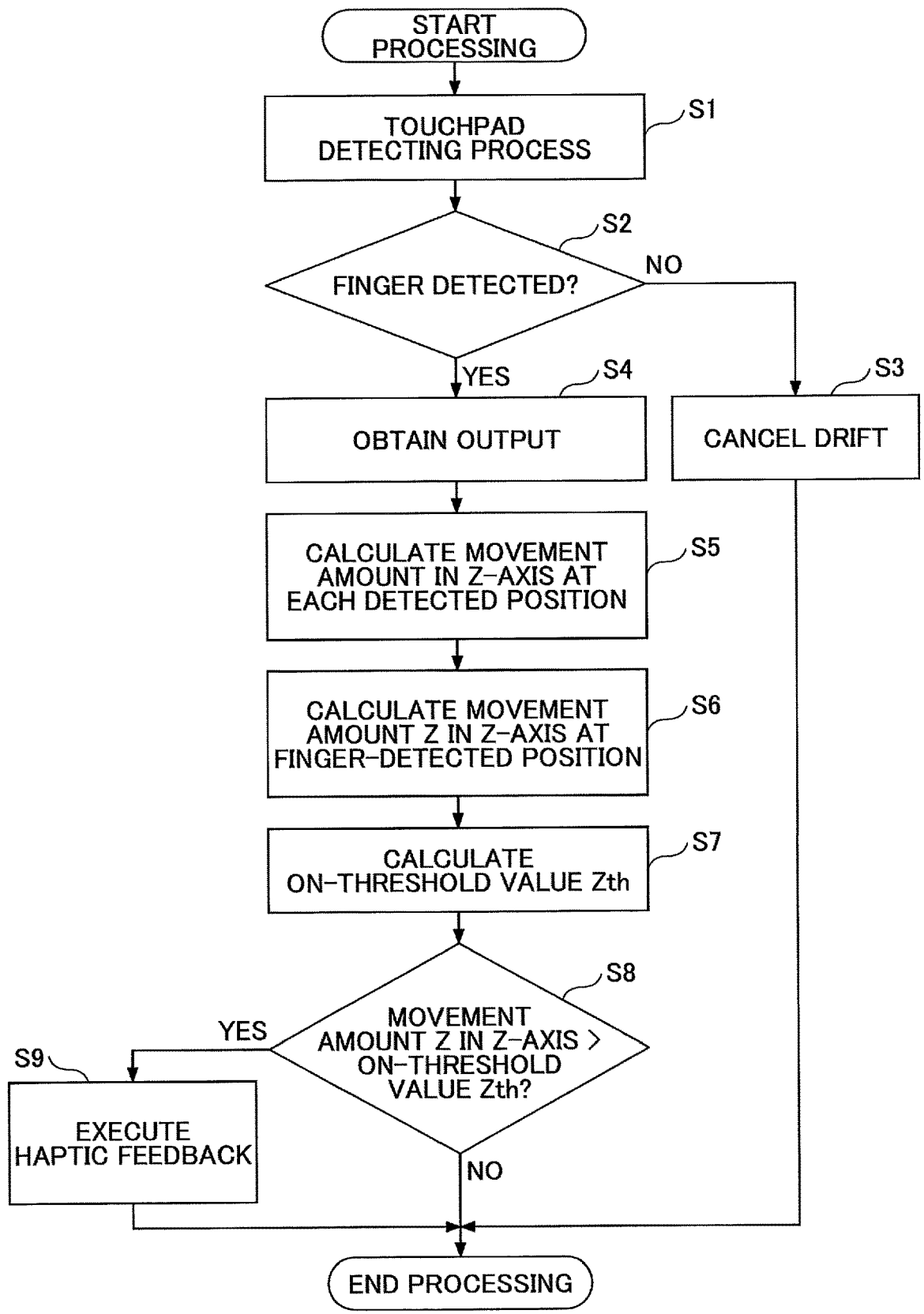
FIG. 9 is a flow chart illustrating contents of processing executed by a control device.

The control device 180 has such a hardware configuration, and executes processing as follows. FIG. 9 is a flow chart illustrating contents of processing executed by the control device 180.

First, the control device 180 detects the touchpad 140 (Step S1). Then, the control device 180 determines whether a finger has contacted the touchpad 140, based on an output of the electrostatic sensor 142 (Step S2). If it is determined that a finger has not contacted the touchpad 140 (No at Step S2), the control device 180 cancels the drift of the photo interrupters 170 (Step S3).

If it is determined that a finger has contacted the touchpad 140 (YES at Step S2), the control device 180 obtains a detection signal from each of the photo interrupters 170 (Step S4). For example, in the case where the output signal of the photo interrupters 170 are an analog signal, a signal after converted to a digital signal is obtained.

Next, the control device 180 calculates an amount of displacement in the Z-axis direction at the detection position of the flat plate part 131 from the respective detection signals of the photo interrupters 170 (Step S5).

Thereafter, the control device 180 calculates an amount of displacement Z in the Z-axis direction at the operating position of the touchpad 140 (Step S6). In other words, the control device 180 calculates the amount of displacement Z in the Z-axis direction at the operating position, from the amount of displacement in the Z-axis direction calculated from the detection signals of all or part of the four photo interrupters 170, and the X coordinate and the Y coordinate of the operating position detected by the touchpad 140.

The control device 180 determines in advance a relationship between the applied load and the amount of displacement in the Z-axis direction, stores the relationship in the ROM 182, and reads this relationship to calculate a threshold value (on threshold value) Zth in the Z-axis direction at the operating position (Step S7).

Then, the control device 180 determines whether the amount of displacement Z exceeds the on threshold value Zth (Step S8). If the amount of displacement Z exceeds the on threshold value Zth (YES at Step S8), the applied load is determined to exceed the reference value, and the control device 180 drives the actuator 160 to generate haptic feedback (Step S9). At this time, based on separately entered information, the control device 180 drives the actuator 160 so as to generate vibration in the X direction or the Z direction. If the amount of displacement Z is less than or equal to the on threshold value Zth (NO at Step S8), the control device 180 does not generate haptic feedback.

According to the operation device 100 configured in this way, as described above, vibration of sufficient strength can be generated in the X direction and the Z direction perpendicular to each other. For example, by vibration in the X direction, a frictional feeling can be given to the operator, and by vibration in the Z direction, a feeling of pressing a switch can be given to the operator. It is easy to adjust the vibration strength in the X direction and the vibration strength in the Z direction.

Figure 10:
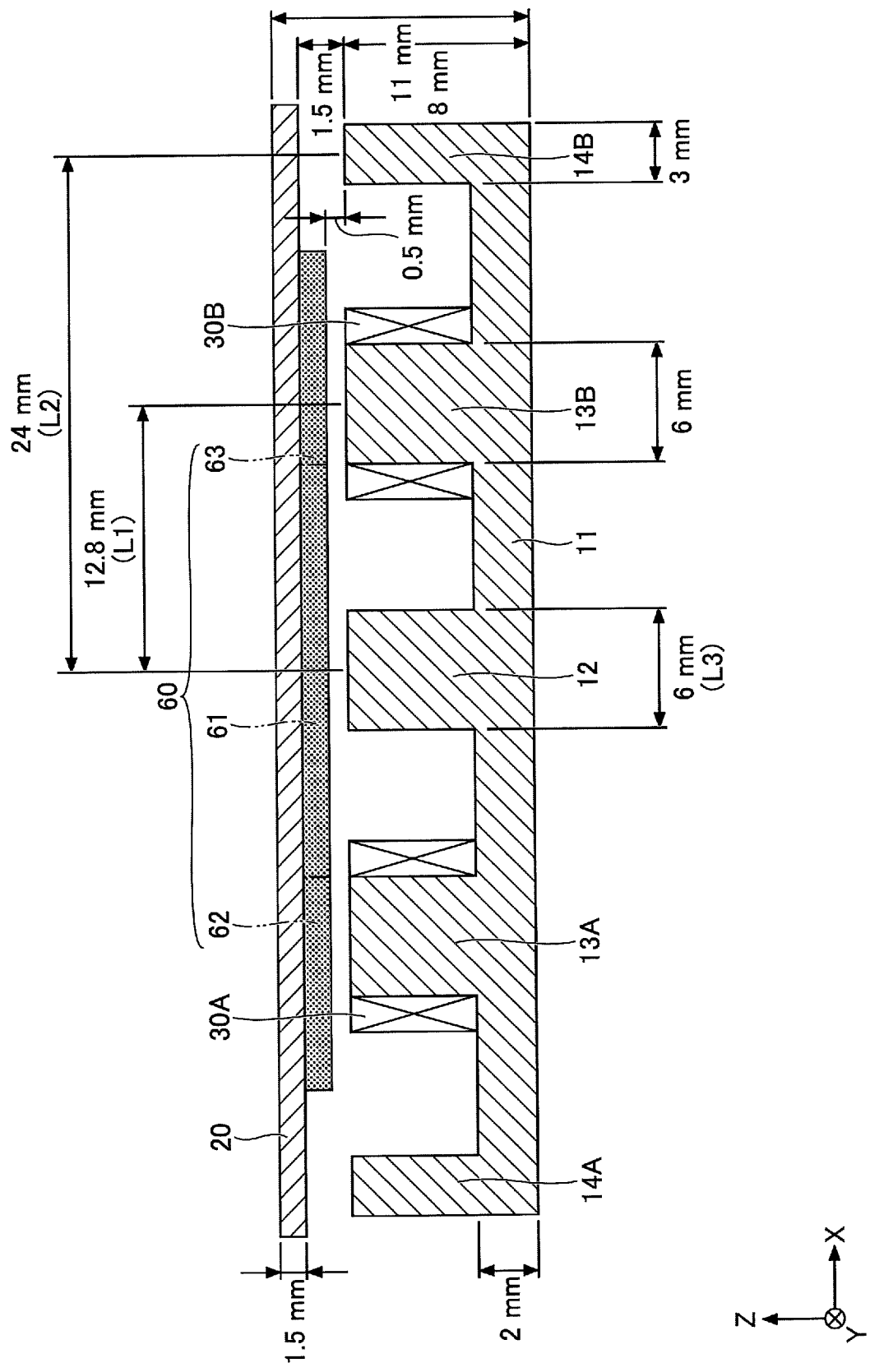
FIG. 10 is a diagram illustrating a simulation model.

Next, simulation related to the above embodiment will be described. FIG. 10 is a diagram illustrating a simulation model.

In this model, it is assumed that the first region 61 has a rectangular plate shape connecting two square plates of 10 mm×10 mm×1 mm along the X direction; the second region 62 and the third region 63 have a square plate shape of 10 mm×10 mm×1 mm; and the maximum energy product of each square plate part is 40 MGOe. A dimension (width) L3 of the central protruding part 12 in the X direction is set to 6 mm in the initial state; a dimension of the first iron core 13A and the second iron core 13B in the X direction is set to 6 mm; and a dimension of the first side protruding part 14A and the second side protruding part 14B in the X direction is set to 3 mm. The base 11 has a thickness of 2 mm, and the central protruding part 12, the first iron core 13A, the second iron core 13B, the first side protruding part 14A, and the second side protruding part 14B have a height of 8 mm with reference to the surface of the base 11. The movable yoke 20 has a thickness of 1.5 mm, and the distance between the bottom surface of the base 11 and the surface of the movable yoke 20 is set to 11 mm. In the initial state, a distance L1 between the center of the central protruding part 12 in the X direction and the center of the first iron core 13A and the center of the second iron core 13B in the X direction is set to 12.8 mm; and a distance L2 between the center of the central protruding part 12 in the X direction, and the center of the first side protruding part 14A in the X direction and the center of the second side protruding part 14B in the X direction is set to 24 mm.

Figure 11:
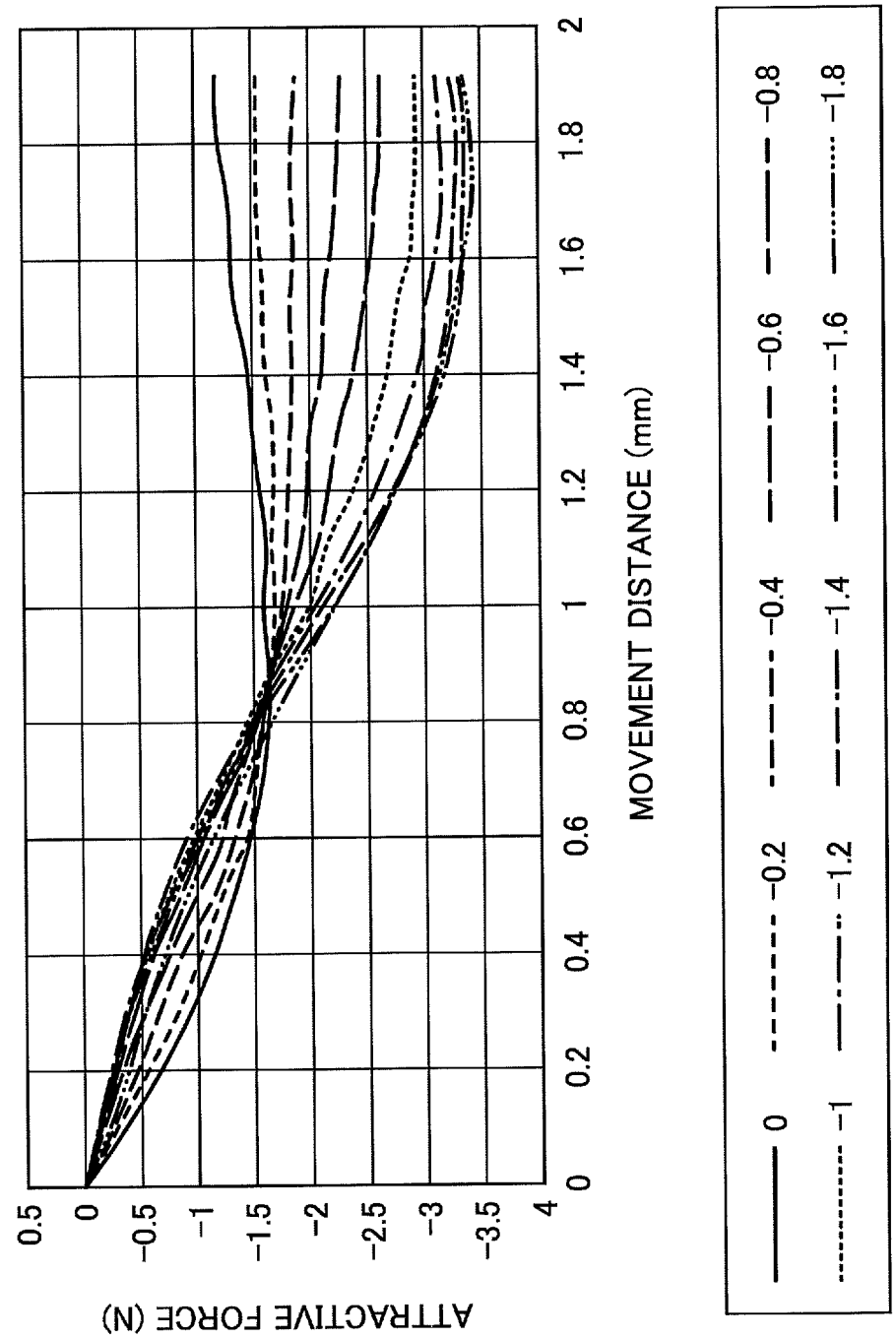
FIG. 11 is a diagram illustrating a relationship between a movement distance of a movable yoke and an attractive force.

First, while having a ratio of the distance L1 to the distance L2 is fixed to (12.8:24), the distance L2 was changed, to calculate a relationship between the movement distance of the movable yoke 20 in the −X direction and the attractive force by a two-dimensional finite element method (FEM). Results are shown in FIG. 11. Numerical values in the legend indicate changes in distance L2 from the initial state. The first excitation coil 30A and the second excitation coil 30B were not energized. In FIG. 11, a greater absolute value of the negative attractive force results in a greater restoring force that causes the permanent magnet 60 to return to the position in the initial state in the X direction.

Figure 12:
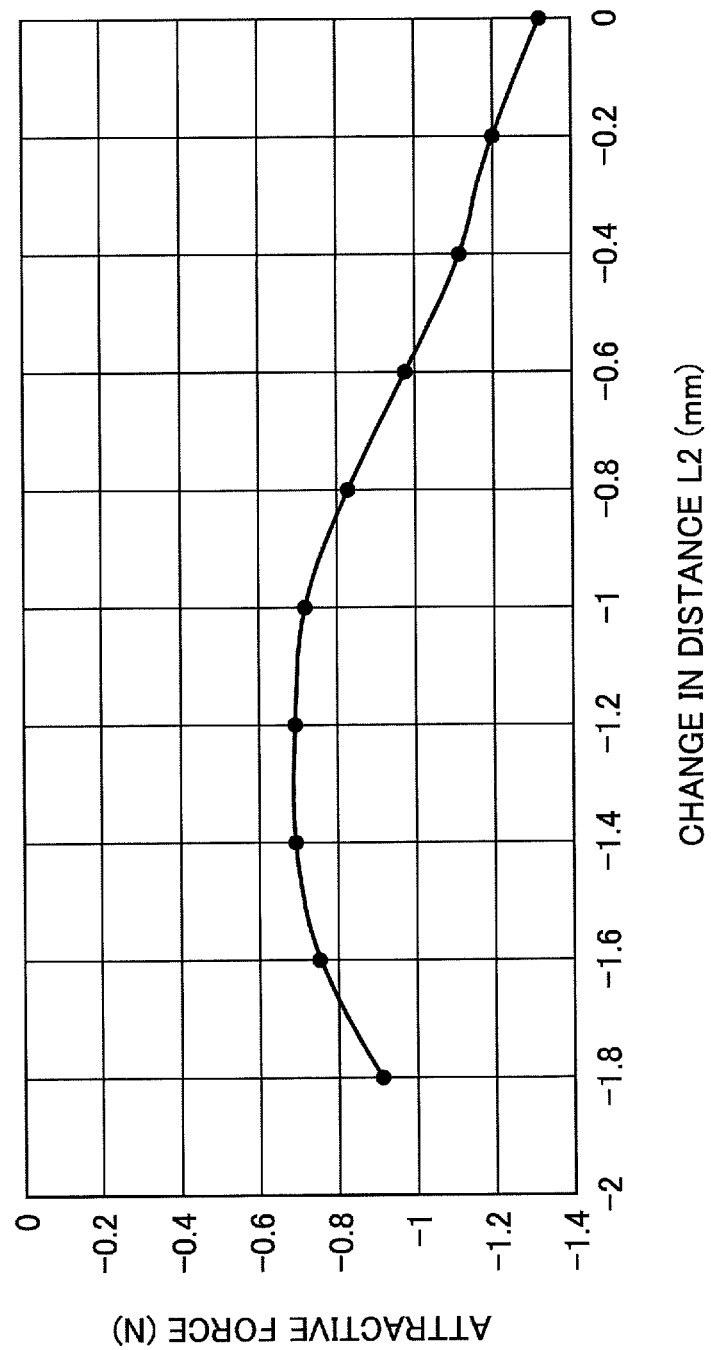
FIG. 12 is a diagram illustrating a relationship between change in a distance L2 and an attractive force.

From FIG. 11, by determining a relationship between the change in distance L2 and the attractive force when the movement distance is 0.5 mm, FIG. 12 is obtained. As illustrated in FIG. 12, the attractive force becomes the weakest when the change in distance L2 is in the vicinity of −1.4 mm, −1.2 mm, and −1.0 mm. As the initial value of distance L2 is 24 mm, in the case of configuring the restoring force to be weakened, it is favorable that the distance L2 is set to around 22.6 mm, 22.8 mm, or 23 mm.

Figure 13A:
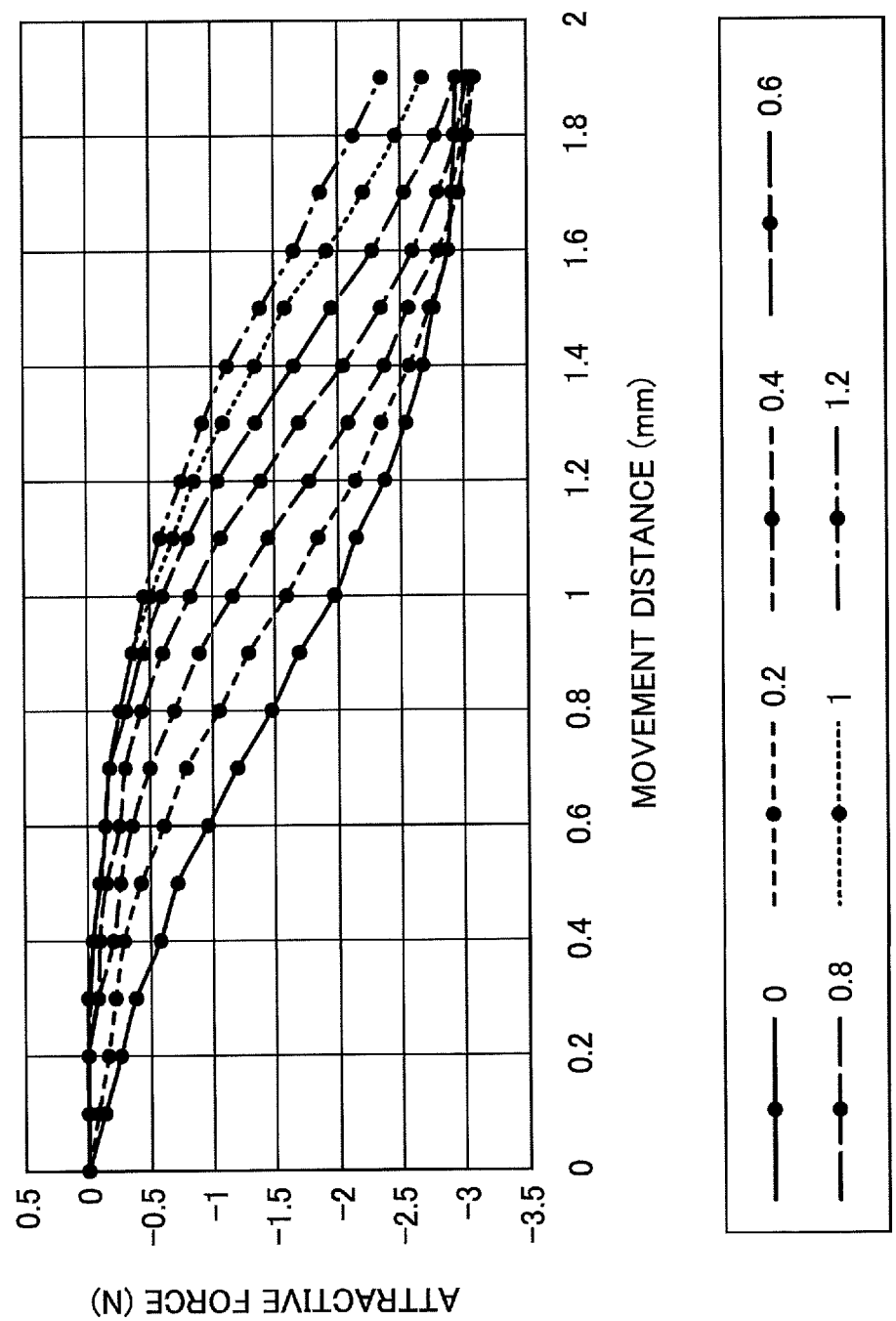
FIG. 13A is a diagram illustrating a relationship between a movement distance of a movable yoke and an attractive force in the case of setting the distance L2 to 23 mm.
Figure 13C:
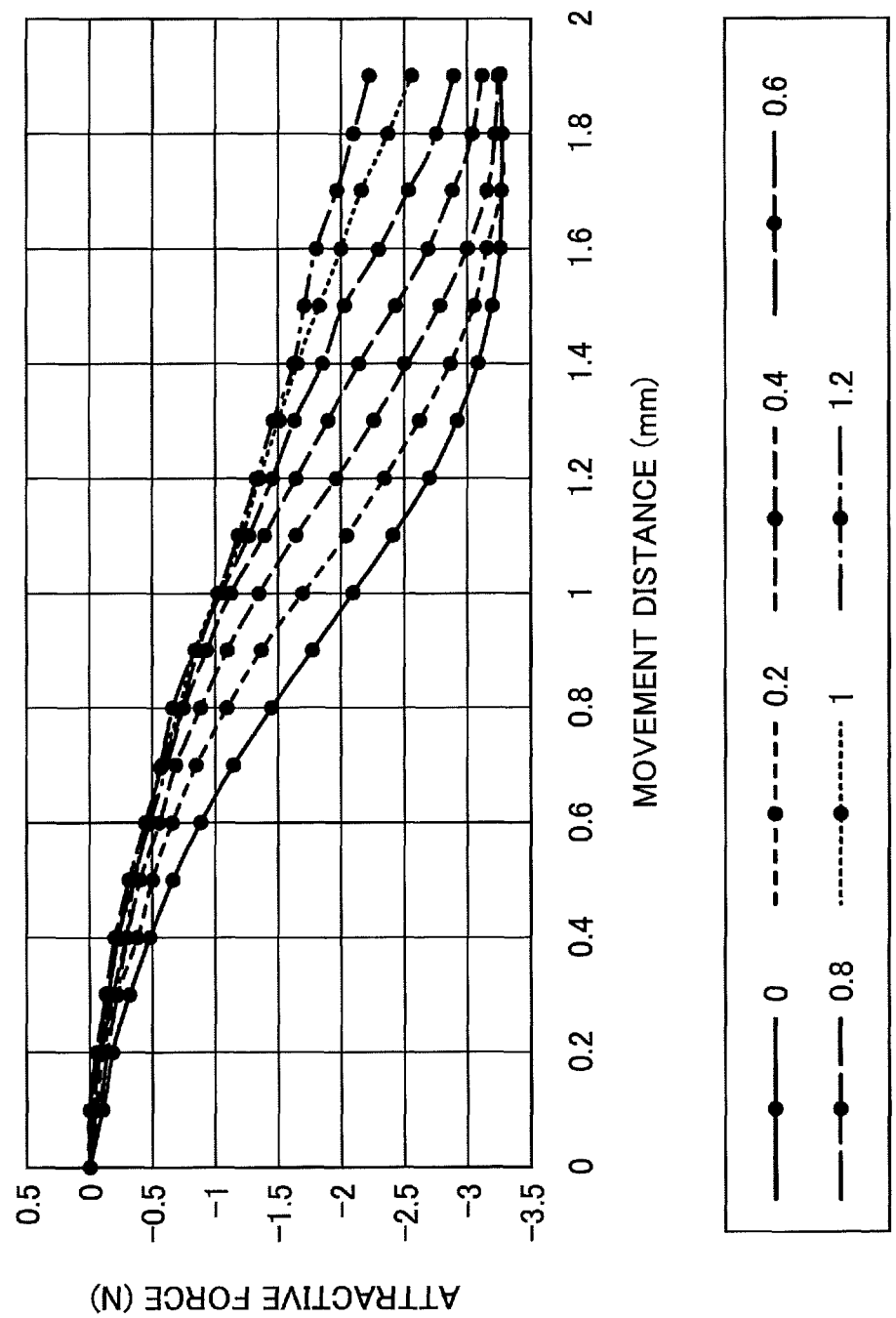
FIG. 13C is a diagram illustrating a relationship between a movement distance of a movable yoke and an attractive force in the case of setting the distance L2 to 22.6 mm.

Thereupon, with setting the distance L2 to 22.6 mm, 22.8 mm, or 23 mm, while changing the distance L1, a relationship between the movement distance of the movable yoke 20 in the −X direction and the attractive force was calculated by the two dimensional FEM. The results are shown in FIGS. 13A, 13B and 13C. Numerical values in the legend indicate changes in distance L1 from the reference values that will be described later. FIG. 13A illustrates the results in the case where the distance L2 was set to 23 mm; FIG. 13B illustrates the results in the case where the distance L2 was set to 22.8 mm; and FIG. 13C illustrates the results in the case where the distance L2 was set to 22.6 mm. Note that the distance L2 was changed from the initial value; therefore, in FIG. 13A, the reference value of the distance L1 was 12.3 mm, in FIG. 13B, the reference value of the distance L1 was 12.2 mm, and in FIG. 13C, the reference value of the distance L1 was 12.1 mm.

From FIGS. 13A to 13C, by determining a relationship between the shortened amount of the distance L1 and the attractive force when the movement distance is 0.5 mm, FIG. 14 is obtained. Numerical values in the legend indicate the distance L2. As illustrated in FIG. 14, in the case of the distance L2 being 22.6 mm, the absolute value of the attractive force is relatively great, or in the case of the distance L2 being 23 mm or 22.8 mm, within a range of the shortened amount of the distance L1 being greater than 0.6 mm, the absolute value of the attractive force is small and almost constant.

From these results, in order to have a configuration in which the restoring force is weakened, it is favorable to set the distance L2 to 23 mm or 22.8 mm, and set the distance L1 to 11 mm to 11.5 mm, and it is favorable that the distance L2 is greater than or equal to 1.2 times and less than or equal to 1.4 times the distance L1. It is more favorable to set the distance L2 to 23 mm.

Figure 15A:
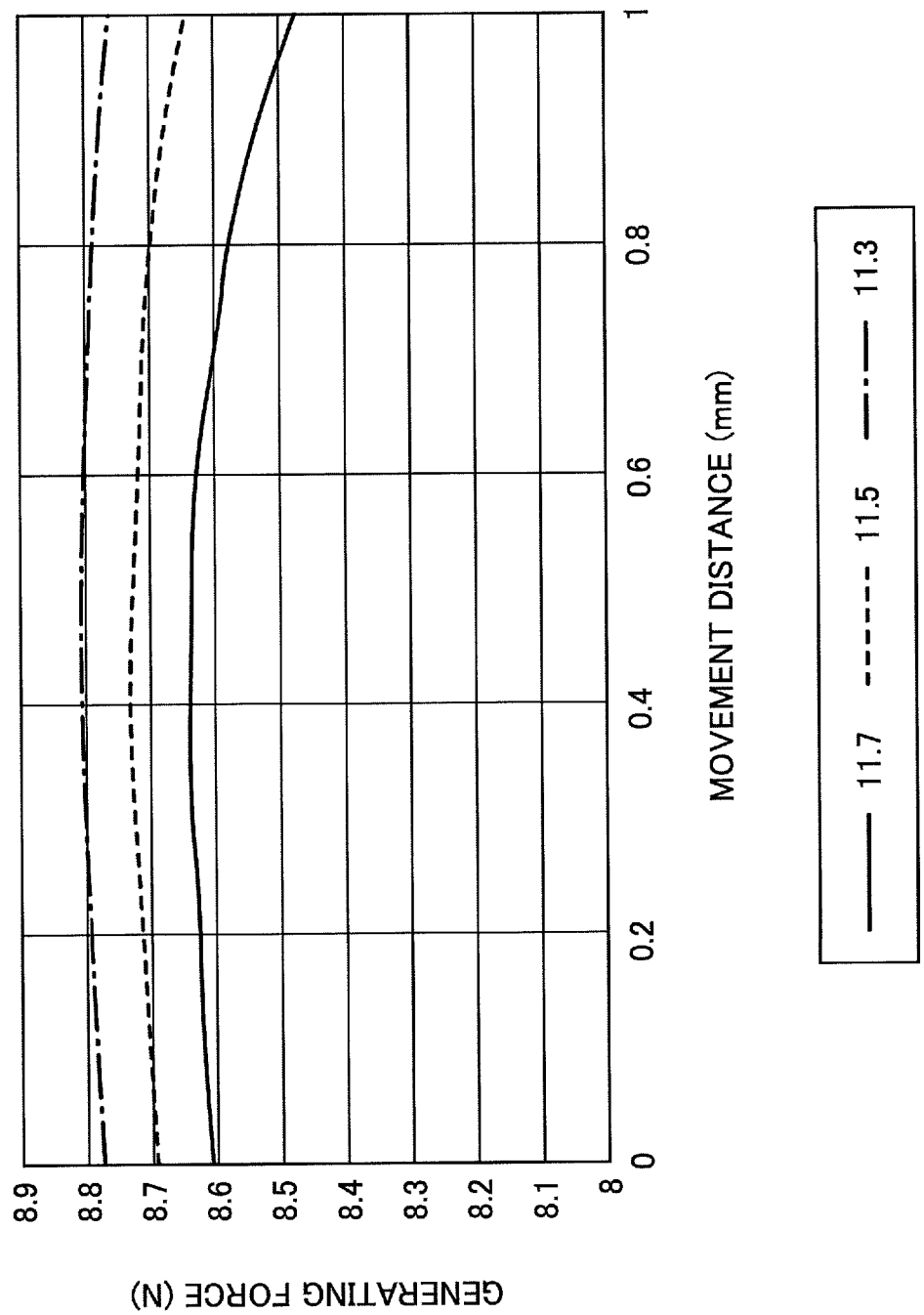
FIG. 15A illustrates a relationship between a distance of a movable yoke and a vibration generating force in the X direction.
Figure 15B:
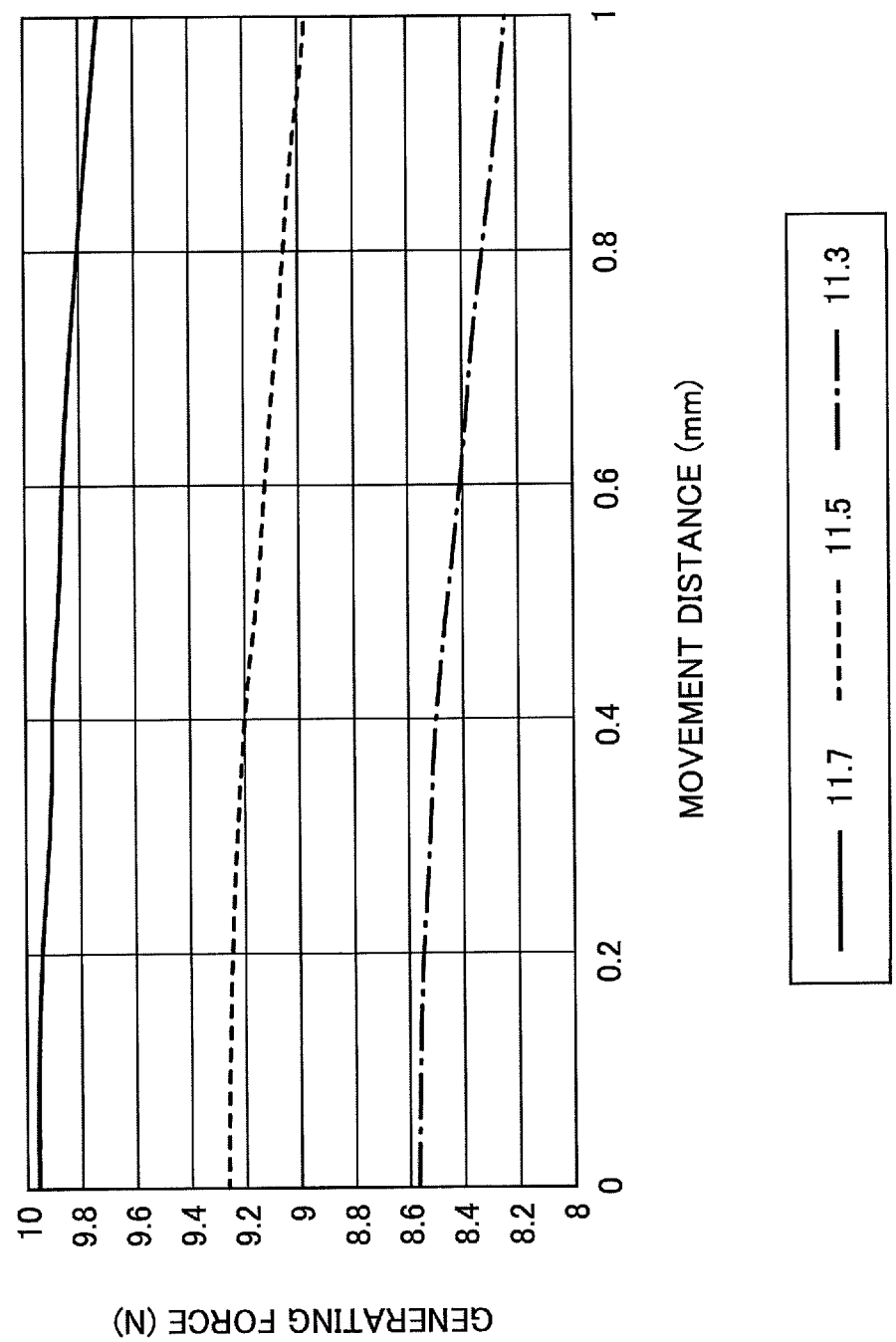
FIG. 15B illustrates a relationship between a distance of a movable yoke and a vibration generating force in the Z direction.

Next, with setting the distance L2 to 23 mm, while energizing the first excitation coil 30A and the second excitation coil 30B, a relationship between the movement distance of the movable yoke 20 in the −X direction, and the vibration generating forces in the X direction and in the Z direction was calculated by the two-dimensional FEM. Results are shown in FIGS. 15A and 15B. Numerical values in the legend indicate the distance L1. FIG. 15A illustrates the vibration generating force in the X direction; and FIG. 15B illustrates the vibration generating force in the Z direction. As illustrated in FIGS. 15A and 15B, even when the movement distance changes, the vibration generating forces in the X direction and in the Z direction do not change significantly. In particular, in the case of the distance L1 being 11.3 mm, the difference between the vibration generating force in the X direction and the vibration generating force in the Z direction is small, which is favorable. In other words, in the case of the distance L1 being 11.3 mm, vibration of particularly great magnitude can be generated in both directions of the X direction and the Z direction.

Figure 16:
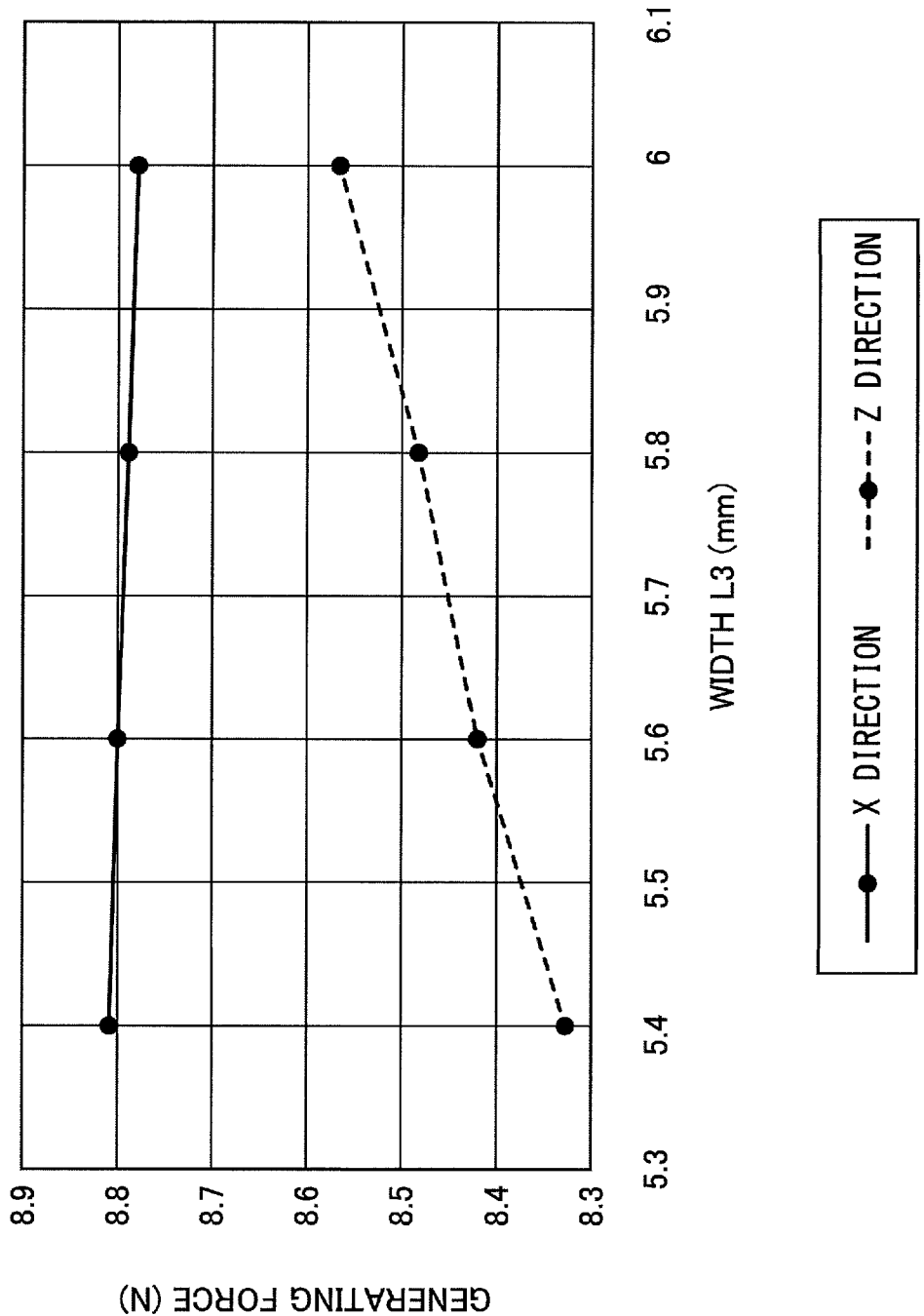
FIG. 16 is a diagram illustrating a relationship between a width L3 of a central protruding part and a vibration generating force.

Next, with setting the distance L1 to 11.3 mm and the distance L2 to 23 mm, while changing the width L3, the vibration generating forces in the X direction and in the Z direction were calculated by the two-dimensional FEM. Results are shown in FIG. 16. Each direction in the legend indicates a direction of vibration. As illustrated in FIG. 16, by changing the width L3, the balance between the vibration generating force in the X direction and the vibration generating force in the Z direction can be adjusted.

Note that the first excitation coil 30A and the second excitation coil 30B may be attached on the base 11, without having the first iron core 13A and the second iron core 13B arranged.

The restoring force causing the permanent magnet 60 to return to the position in the initial state in the X direction (the center restoring force) depends on the direction and the degree in which the boundary 612 is not coincident with the axial core of the first excitation coil 30A, and the direction and the degree in which the boundary 613 is not coincident with the axial core of the second excitation coil 30B. Furthermore, the direction and the degree in which the boundary 612 is not coincident with the axial core of the first excitation coil 30A, and the direction and the degree in which the boundary 613 is not coincident with the axial core of the second excitation coil 30B are not limited in particular. For example, the boundary 612 may be positioned in the −X direction relative to the axial core of the first excitation coil 30A, and the boundary 613 may be positioned in the +X direction relative to the axial core of the second excitation coil 30B. In other words, the boundary 612 may be positioned in the −X direction relative to the center of first iron core 13A, and the boundary 613 may be positioned in the +X direction relative to the center of second iron core 13B. In this case, compared to the structure in which the boundary 612 is positioned in the +X direction relative to the axial core of the first excitation coil 30A, and the boundary 613 is positioned in the −X direction relative to the axial core of the second excitation coil 30B, the restoring force causing the permanent magnet 60 to return to the position in the initial state in the X direction (the center restoring force) becomes weaker. In this way, by adopting a configuration in which the boundary 612 is not coincident with the axial core of the first excitation coil 30A in the X direction, and the boundary 613 is not coincident with the axial core of the second excitation coil 30B in the X direction, the center restoring force can be adjusted. Note that the boundary 612 may be coincident with the axial core of the first excitation coil 30A in the X direction, and the boundary 613 may be coincident with the axial core of the second excitation coil 30B in the X direction.

The upper end and the lower end of the first rubber 40A may be fixed to the movable yoke 20 and the first side protruding part 14A, respectively, and the upper end and the lower end of the second rubber 40B may be fixed to the movable yoke 20 and the second side protruding part 14B, respectively. The upper end of the first rubber 40A may be fixed to the movable yoke 20, whereas the lower end is simply fitted firmly to the first side protruding part 14A without being fixed; and the upper end of the second rubber 40B may be fixed to the movable yoke 20, whereas the lower end is simply fitted firmly to the second side protruding part 14B without being fixed. The lower end of the first rubber 40A may be fixed to the first side protruding part 14A, whereas the upper end is simply fitted firmly to the movable yoke 20 without being fixed; and the lower end of the second rubber 40B may be fixed to the second side protruding part 14B, whereas the upper end is simply fitted firmly to the movable yoke 20 without being fixed. By having either one of the upper end or the lower end of the first rubber 40A and the second rubber 40B fixed to the movable yoke 20, the first side protruding part 14A, or the second side protruding part 14B, and having the other end fitted firmly without being fixed, assembly workability can be improved.

The shape and the modulus of elasticity of the first rubber 40A and the second rubber 40B are not limited in particular. In the first rubber 40A and the second rubber 40B, the modulus of elasticity in the X direction may be different from the modulus of elasticity in the Z direction. In the movable part supporting elastic member, the modulus of elasticity in the X direction may be different from the modulus of elasticity in the Z direction.

The resonance frequency of vibration of the movable yoke 20 depends on the modulus of elasticity of the first rubber 40A and the second rubber 40B and the mass of the movable yoke 20. Therefore, for example, by having the modulus of elasticity in the X direction different from the modulus of elasticity in the Z direction, for example, the resonance frequency of vibration in the Z direction of the movable yoke 20 can be set around 200 Hz, and the resonance frequency of vibration in the X direction can be around 100 Hz. In general, vibration at a resonance frequency around 200 Hz is suitable for presenting tactile feeling (feeling of clicking), and vibration at a resonance frequency around 100 Hz is suitable for presenting rubber feeling (feeling of elasticity of rubber). Therefore, by having the modulus of elasticity in the X direction different from the modulus of elasticity in the Z direction, tactile feeling and rubber feeling can be presented. The amplitude of the vibration of the movable yoke 20 also depends on the modulus of elasticity of the first rubber 40A and the second rubber 40B, and becomes smaller as the modulus of elasticity of the first rubber 40A and the second rubber 40B becomes greater.

The operation member is not limited to an operation panel member such as the touchpad 140, and may be a push button having an operation surface.

Note that a non-contact position detection sensor, such as an electrostatic sensor, may be used instead of the photo interrupters 170. A pressure sensitive sensor may be used for detecting pressure applied to the touchpad 140.

The operation device in the present disclosure is particularly suitable for an operation device to be arranged on the center console of an automobile. As the center console is arranged between the driver's seat and the front passenger's seat, the planar shape of the operation device arranged on the center console may become complex. In the operation device in the present disclosure, the magnitude of vibration is stable in the operating surface; therefore, even if the planar shape of the operation member is complex, appropriate haptic feedback can be generated.

As described above, the favorable embodiments and the like have been described in detail; note that the embodiments and the like can be changed and replaced in various ways without deviating from the scope described in the claims.

What is claimed is:

1. An electromagnetic drive device comprising:
   a first yoke;
   a second yoke arranged to be opposite to the first yoke in a first direction;
   a permanent magnet attached to a surface of the first yoke facing the second yoke; and
   a first excitation coil and a second excitation coil attached to the second yoke to generate magnetic flux when being energized,
   wherein the second yoke includes
      a base, and
      a first protruding part protruding from the base toward the first yoke, between the first excitation coil and the second excitation coil,
   wherein the first excitation coil and the second excitation coil are arranged to have the first protruding part interposed in-between in a second direction perpendicular to the first direction,
   wherein an axial core direction of the first excitation coil and the second excitation coil is parallel to the first direction,
   wherein the permanent magnet includes
      a first region,
      a second region positioned on one side of the first region in the second direction, and
      a third region positioned on another side of the first region in the second direction,
   wherein the first region is magnetized to be a first magnetic pole,
   wherein the second region and the third region are magnetized to be second magnetic poles,
   wherein the first region is opposite to the first protruding part,
   wherein a boundary between the first region and the second region is opposite to the first excitation coil, and
   wherein a boundary between the first region and the third region is opposite to the second excitation coil.

2. The electromagnetic drive device as claimed in claim 1, wherein the second yoke further includes
   a first iron core on which the first excitation coil is wound, and
   a second iron core on which the second excitation coil is wound.

3. The electromagnetic drive device as claimed in claim 1, wherein in the second direction, the boundary between the first region and the second region is not coincident with an axial core of the first excitation coil, and
   wherein in the second direction, the boundary between the first region and the third region is not coincident with an axial core of the second excitation coil.

4. The electromagnetic drive device as claimed in claim 1, wherein the second yoke further includes two second protruding parts protruding from the base toward the first yoke that are arranged at positions between which the first excitation coil and the second excitation coil are interposed in the second direction, and
   wherein a magnetic attractive force is generated between one of the second protruding parts and one edge of the first yoke, and a magnetic attractive force is generated between another of the second protruding parts and another edge of the first yoke.

5. The electromagnetic drive device as claimed in claim 4, wherein in the second direction, a distance from a center of the first protruding part to a center of the second protruding part is greater than or equal to 1.2 times and less than or equal to 1.4 times a distance from the center of the first protruding part to the boundary between the first region and the second region, and a distance from the center of the first protruding part to the boundary between the first region and the third region.

6. The electromagnetic drive device as claimed in claim 1, further comprising:
an elastic support member arranged between the first yoke and the second yoke, to hold the first yoke to be capable of being vibrated with respect to the second yoke.

7. The electromagnetic drive device as claimed in claim 6, wherein a modulus of elasticity of the elastic support member in the first direction is different from a modulus of elasticity of the elastic support member in the second direction.

8. An operation device comprising:
a fixed part;
a movable part having an operation member to receive a press operation;
a movable part supporting elastic member configured to hold the movable part to be capable of being vibrated with respect to the fixed part; and
the electromagnetic drive device as claimed in claim 1, arranged between the fixed part and the movable part, wherein one of the first yoke or the second yoke is attached to the fixed part, and another of the first yoke or the second yoke is attached to the movable part.

9. The operation device as claimed in claim 8, wherein in a plane perpendicular to the first direction, said another of the first yoke or the second yokes is attached to a position overlapping a center of gravity of the movable part.

10. The operation device as claimed in claim 8, wherein a modulus of elasticity of the movable part supporting elastic member in the first direction is different from a modulus of elasticity the movable part supporting elastic member in the second direction.

11. The operation device as claimed in claim 8, further comprising:
a control unit configured to control respective currents flowing through the first excitation coil and the second excitation coil, so as to cause directions of magnetic fields generated by energizing the first excitation coil and the second excitation coil, to be a same direction or opposite directions.

12. The operation device as claimed in claim 11, wherein the control unit controls directions of the currents flowing through the first excitation coil and the second excitation coil, to be inverted alternately.

* * * * *